(12) United States Patent
    Nance

(10) Patent No.: US 9,320,189 B2
(45) Date of Patent: *Apr. 26, 2016

(54) TILLAGE SYSTEM

(71) Applicant: John D. Nance, Ringoes, NJ (US)

(72) Inventor: John D. Nance, Ringoes, NJ (US)

(*) Notice: Subject to any disclaimer, the term of this patent is extended or adjusted under 35 U.S.C. 154(b) by 48 days.

This patent is subject to a terminal disclaimer.

(21) Appl. No.: 14/153,944

(22) Filed: Jan. 13, 2014

(65) Prior Publication Data

US 2014/0123885 A1 May 8, 2014

Related U.S. Application Data

(63) Continuation-in-part of application No. 12/658,486, filed on Feb. 8, 2010, now Pat. No. 8,627,898.

(51) Int. Cl.
*A01B 49/06* (2006.01)
*A01B 23/06* (2006.01)
*A01B 49/02* (2006.01)

(52) U.S. Cl.
CPC .............. *A01B 49/06* (2013.01); *A01B 23/06* (2013.01); *A01B 49/02* (2013.01)

(58) Field of Classification Search
CPC ........ A01B 51/00; A01B 51/04; A01B 59/00; A01B 49/02; A01B 49/06; A01B 23/06
See application file for complete search history.

(56) References Cited

U.S. PATENT DOCUMENTS

| | | | |
|---|---|---|---|
| 369,163 A | 8/1887 | Clark | 172/555 |
| 1,954,783 A | 4/1934 | Bohmker | 172/599 |
| 3,718,103 A | 2/1973 | Orthman | 172/159 |
| 3,870,108 A | 3/1975 | Orthman | 172/722 |
| 3,941,193 A | 3/1976 | Shoemaker | 172/106 |
| 4,102,406 A | 7/1978 | Orthman | 172/540 |
| 4,538,688 A | 9/1985 | Szucs et al. | 172/555 |
| 4,539,921 A * | 9/1985 | Morlock | 111/52 |
| 4,834,189 A | 5/1989 | Peterson et al. | 172/166 |
| 5,431,232 A * | 7/1995 | Kirsch | 172/438 |
| 5,623,997 A | 4/1997 | Rawson et al. | 172/156 |
| 5,649,602 A | 7/1997 | Bruce | 172/604 |
| 5,797,460 A | 8/1998 | Parker et al. | 172/151 |
| 7,575,066 B2 | 8/2009 | Bauer | 172/540 |
| 8,079,425 B1 * | 12/2011 | Van Kooten et al. | 172/799.5 |
| 8,627,898 B2 * | 1/2014 | Nance | 172/146 |
| 2004/0016554 A1 | 1/2004 | McDonald | 172/146 |

* cited by examiner

*Primary Examiner* — Jamie L McGowan
(74) *Attorney, Agent, or Firm* — Ernest D. Buff & Assoc. LLC; Ernest D. Buff; Dave Narasimhan

(57) ABSTRACT

An add-on tillage system is adapted to be mounted on an agricultural device to enhance tilling ability. The add-on tillage system includes a tilling unit with a common tool bar having attached thereto a first set of a plurality of tilling tines or coulters adapted to produce deep grooves in a tilled field. Means are provided for adjusting spacing between the tines or coulters, tilling tines or coulters up and down as a group being loaded by spring force, compressed air pistons or hydraulically actuated rams. A first mount is adapted to receive a tongue with hydraulic operations for mounting to a tractor. A second mount is adapted to receive a tongue with hydraulic mount to an agricultural device adapted to be pulled by the tractor. The add-on tillage system tills surface soil for a clean appearance, providing improved rain/irrigation water absorption, eliminating water run-off and erosion.

18 Claims, 21 Drawing Sheets

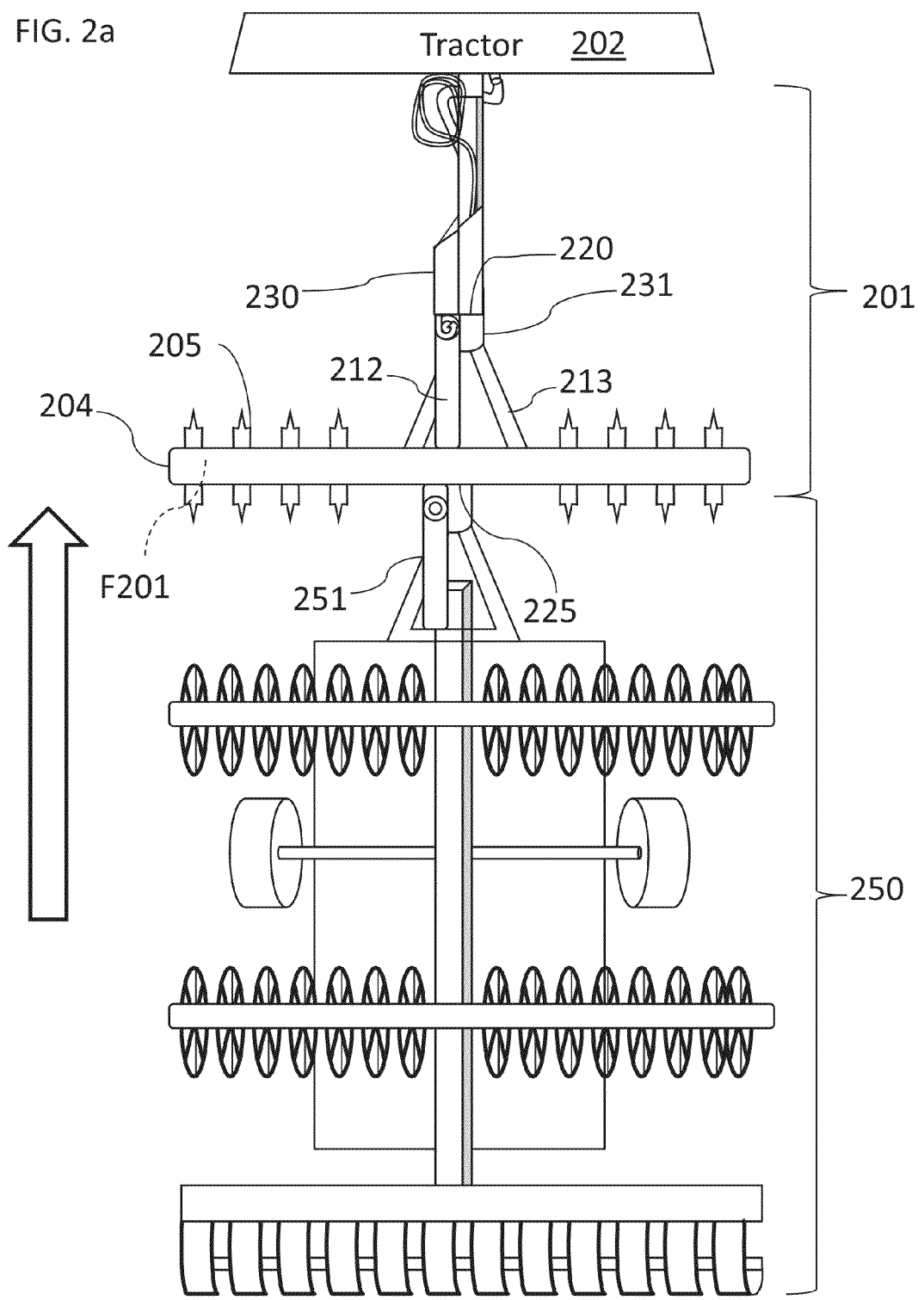

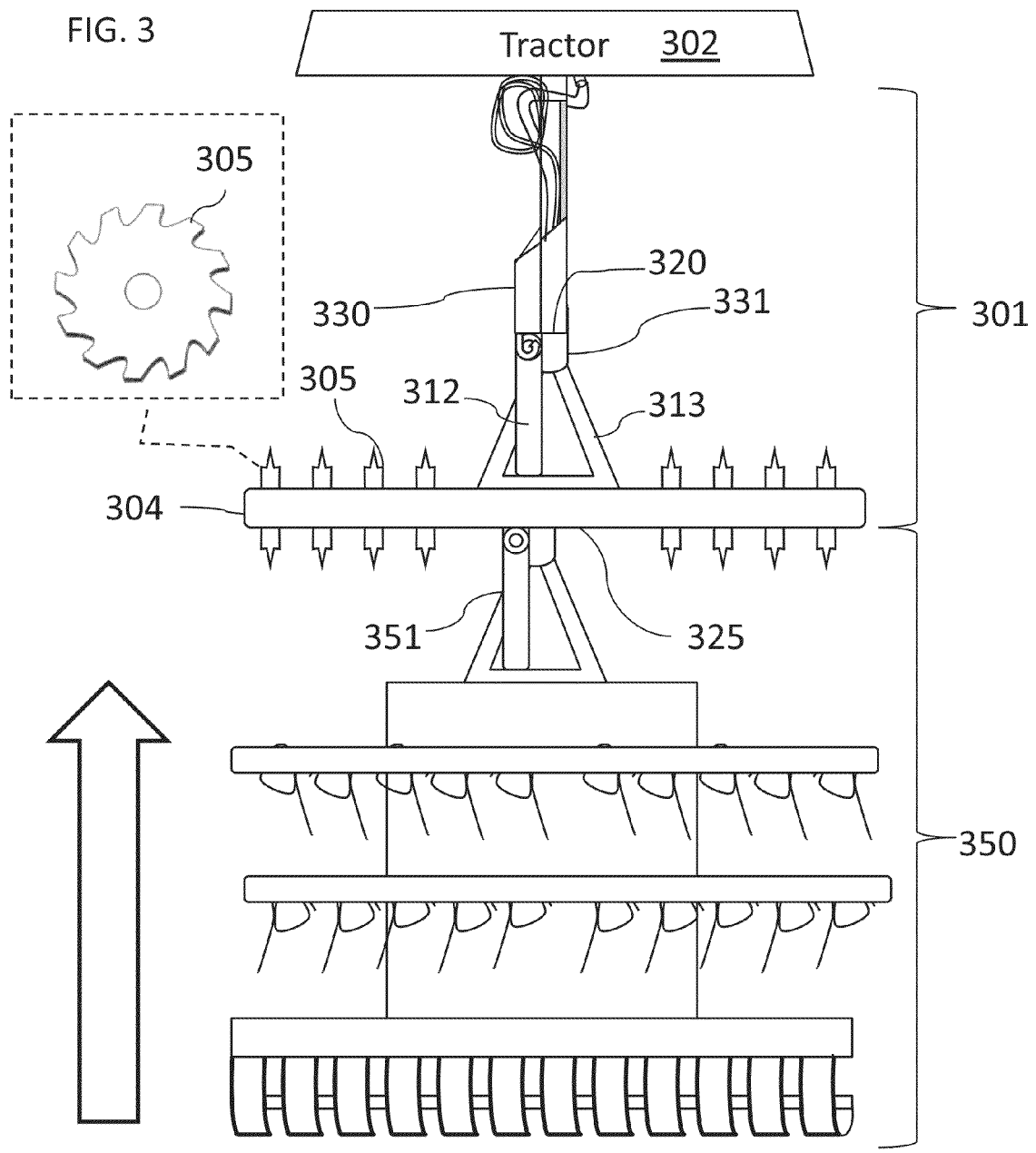

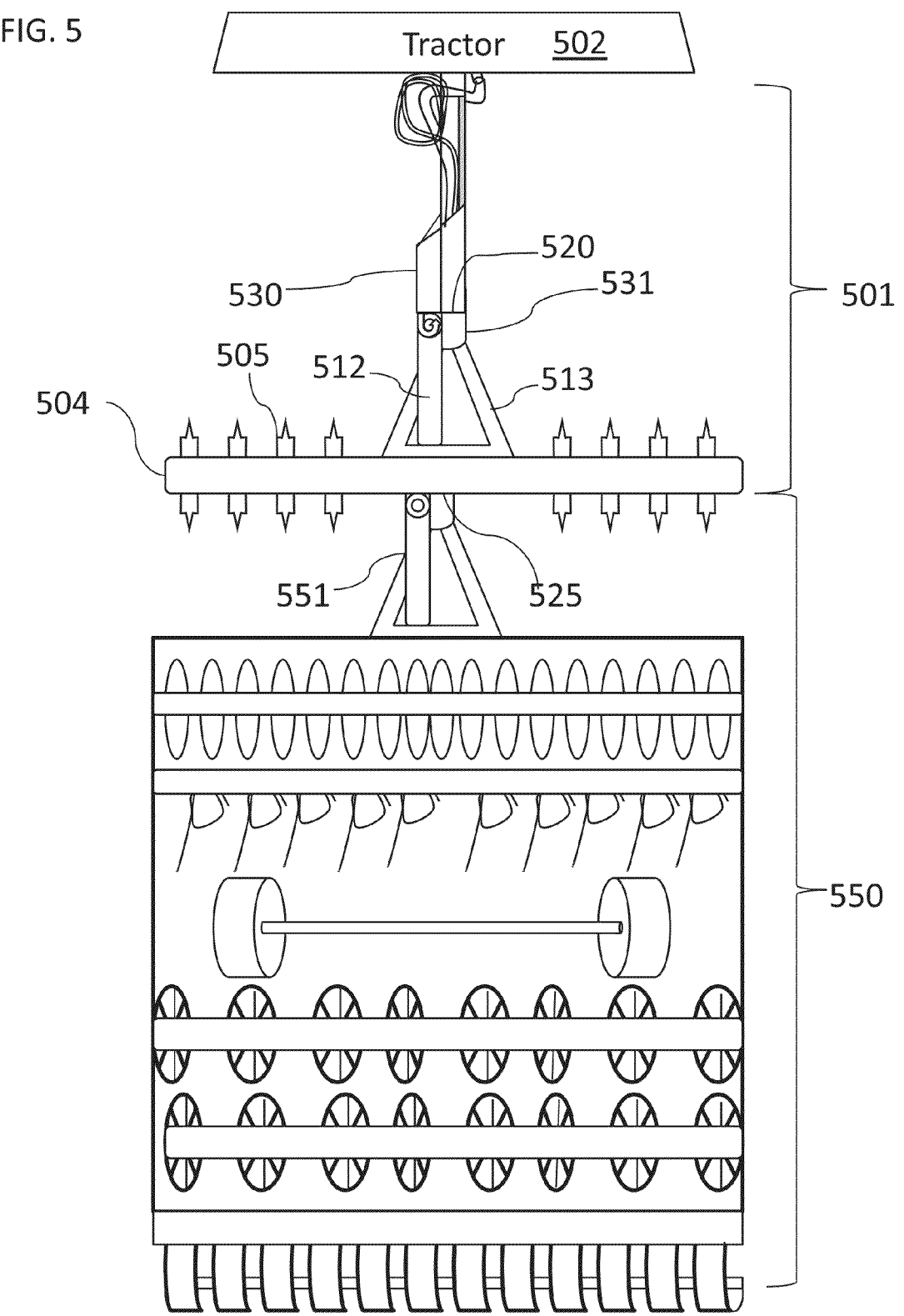

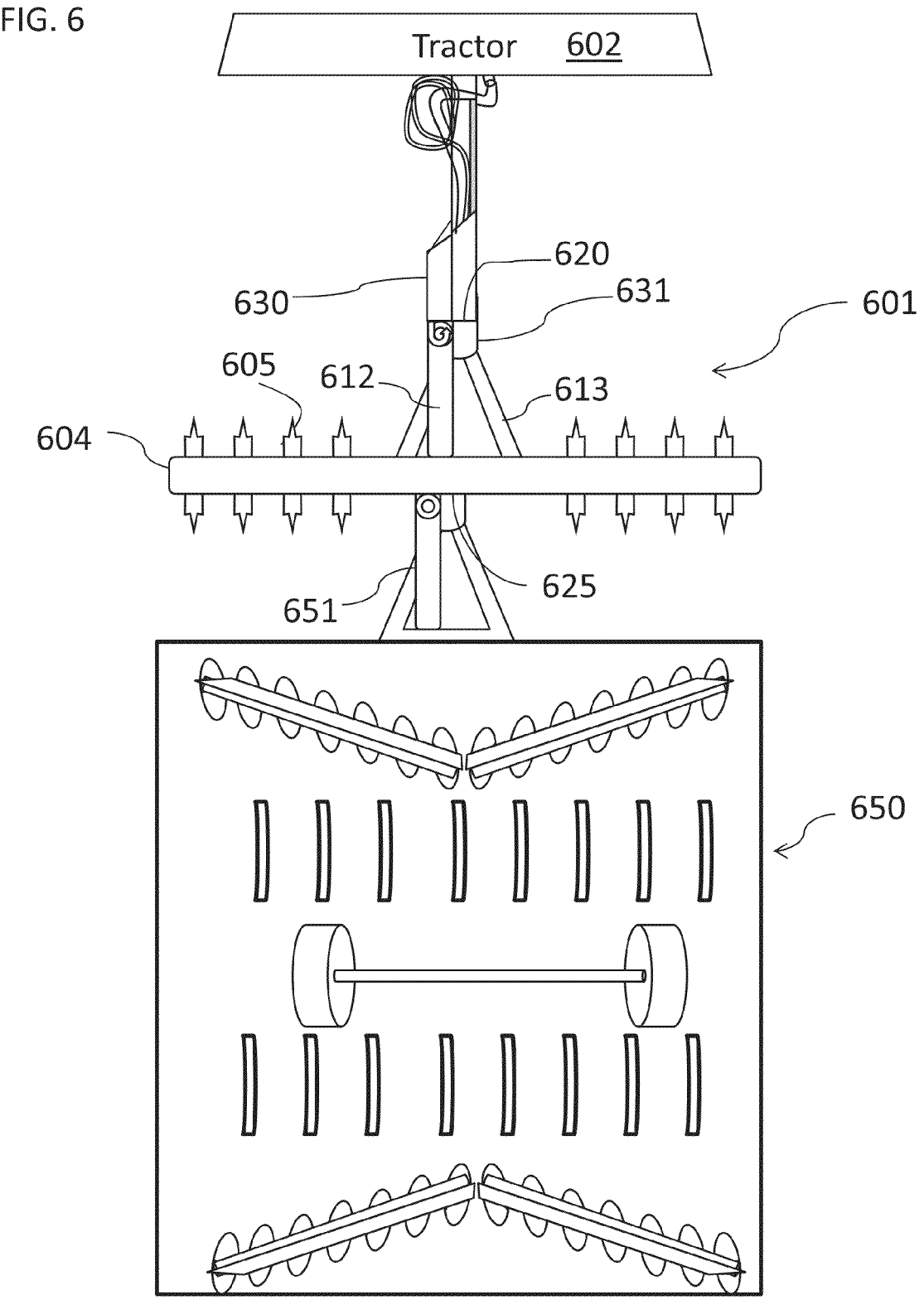

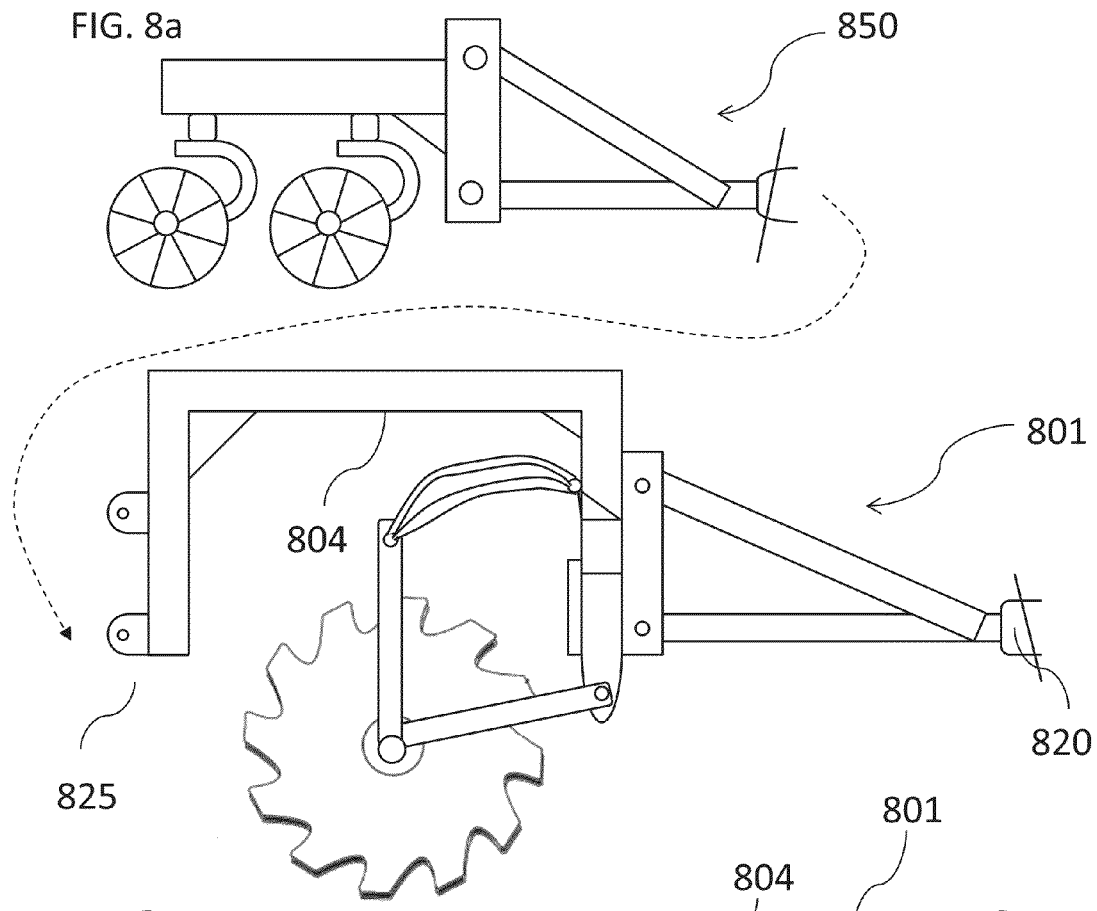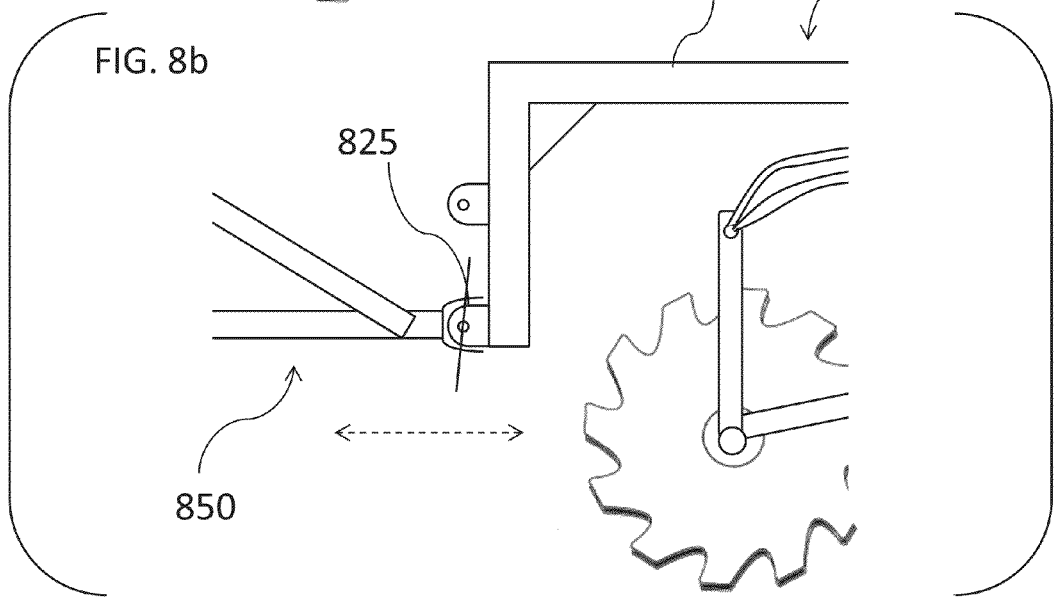

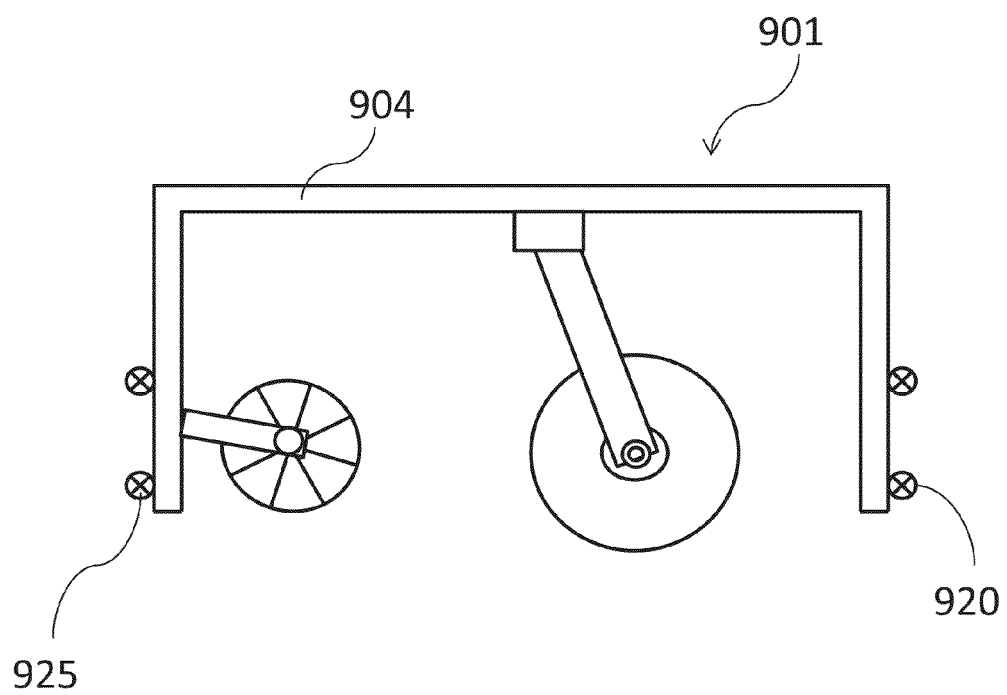

TILLAGE SYSTEM

This is a Continuation-In-Part of U.S. application Ser. No. 12/658,486 filed Feb. 8, 2010 for "Tillage System", the disclosure of which is hereby incorporated in its entirety by reference thereto.

BACKGROUND OF THE INVENTION

1. Field of the Invention

The present invention relates to a tillage system used by farmers to till a field in spring prior to planting and in fall after harvesting farm crops; and, more particularly to a tillage system used to produce deep tilled rows and shallow tilled regions therebetween, leaving behind a smooth clean-tilled field that conserves water and soil fertility without excessive soil erosion.

2. Description of the Prior Art

Many patents address issues related to tilling a farm field. Several of the tillage systems are designed to deep-till a field. Such deep-tilling causes top soil loss due to soil erosion. In addition, deep-tilling degrades field fertility more and more each year. Run-off of soil and fertilizer tends to pollute rivers and waterways. Some of the patents restrict deep tilling to spaced rows. These tillage systems practice minimal tillage principles and leave behind compacted soil between deep tilled rows with stocks of weed protruding from the soil resulting in unsightly field after the tillage operation. Besides, the compacted soil between the deep tilled rows encourages water run offs and soil erosion at the deep tilled rows.

U.S. Pat. No. 3,941,193 to Shoemaker discloses a ground tilling apparatus. The tilling apparatus characterized by a regulating drive connection between the towing tractor drive axle and the tiller shaft, the tiller tines having a modified arcuate configuration which provide a pocketed, rather than a furrowed or channeled, tilling depth profile. The tiller shaft drives the tiller in the same direction with the tiller circumferential speed substantially equal to the ground speed of the tractor, whereby said tips generate a curtate cycloidal curve as the tines rotate and the tips pierce the ground by curtate cycloidal movement with the shank portions following in the holes formed by the tips. This tilling apparatus has two sets of tilling tines oriented and turned in opposite directions. The first tine rotational speed is matched to the ground speed so as to remove large clumps of soil and the second set of tines bust the clumps. The device does not till deep along planting rows.

U.S. Pat. No. 4,102,406 to Orthman discloses a ground conditioning device and method of conditioning soil. This device creates water-holding and retaining cavities that are formed in furrows with the cavities being staggered between adjacent rows. An arm spring biased downwardly carries a hub having spikes in planes laterally spaced apart with the spikes around the hub being staggered between the planes. Each spike is concave longitudinally and in transverse cross section and is secured to opposite sides of a disc mounting plate by a pair of clamping elements one of which is integrally connected to the mounting plate. The hiller row unit is used after the row crop is established in a bed prepared by the splitter or shaper equipment that is disclosed in U.S. Pat. Nos. 3,718,103 and 3,870,108. The hiller provides for ridging with an absolute minimum of root pruning with only the soil that is used to build the ridge being disturbed. The device does not deep-till a plurality of parallel rows where seed planting is planned.

U.S. Pat. No. 4,834,189 to Peterson et al. discloses a row crop cultivator. The row crop cultivator is adapted for use in minimum tillage applications. A plurality of ganged cultivating units is mounted on a tool bar adapted to be towed behind a tractor vehicle. Each cultivating unit comprises a frame, which is supported on a pair of spaced-apart gauge wheels. Also mounted on the frame for rotation within the gap between the gauge wheels is a disk-shaped coulter blade, which is configured to cut through crop residue and weed debris as the material being cut is held against the ground surface by the gauge wheels. This arrangement tends to prevent improper cutting known as "hair-pinning". Trailing directly behind the coulter blade is a middleworker comprising a narrow width shank depending from the frame. The shank has a weld point on its lower leading edge and winglike share blades flaring rearwardly and outwardly at a predetermined angle from the lower end of the shank. The middleworker design reduces the tendency for slabs of earth to be thrown onto and thereby damaging growing row crops. The row crop cultivator shields the row of plants that are growing in rows with a pair of coulters and the portion between the rows is weeded or disturbed by a horizontal tiller. The row crop cultivator does not deep-till the field at row planting locations.

U.S. Pat. No. 5,623,997 to Rawson et al. discloses a soil zone-builder coulter closer/tiller. The soil manipulation device is provided for closing a groove in soil formed by a soil tiller shank. The device includes a frame connected to a rear portion of the tiller shank and a pair of rotatable coulter blades mounted on the frame for engaging soil behind the tiller shank. The coulter blades are positioned on opposite sides of the groove so as to close the groove in the soil behind the tiller shank. The coulter blades are selectively movable and positionable in directions toward and away from each other so as to vary the distance between the coulter blades. The coulter blades also are selectively movable and positionable in a substantially vertical direction with respect to the frame, so as to permit variation in depth of coulter blade penetration into the soil. The coulter blades have side surfaces, which are selectively movable and positionable from orientations which are substantially in parallel with the groove to orientations which are out of parallel with the groove, so as to variably manipulate soil on opposite sides of the groove. The tiller meant for inserting seeds is followed by two coulters that close the soil groove formed by the tiller. The coulters may be independently positioned to adjust the groove closing process. The device of the '997 patent does not till a field; but rather plants seeds in a previously tilled field and closes the grove formed after setting plant seeds in the groove.

U.S. Pat. No. 7,575,066 to Bauer discloses a zone tillage tool and method. This patented device is marketed as "Soilwarrior", and detailed by the web page at http://www.soilwarrior.com/soil.php. This zone tillage tool comprises a tool frame connected by a parallel lift linkage to a tool bar. A fall tillage coulter or dual spring tillage coulters can be carried on the tool frame in advance of a pair of containment coulters. The fall tillage coulter tills soil in a zone that is approximately 7 to 9 inches deep while the spring tillage coulters till 2 to 3 inches deep. The tillage tool has a tool bar that mounts a plurality of tools with its own tool frames carrying independently controllable tillage coulter followed by a pair of slanted containment coulters in the direction of movement of the tillage tool. The tillage tool with its plurality of tillage coulter and containment coulters only creates deep tilled grooves in the field at the places where planting will be done. Spaces between these deep grooves are not tilled, and the soil remains undisturbed with all the weeds still in place, creating an unsightly appearance, Moreover, when rain water or irrigation water is applied to the field, all the water runs into the deep grooves, which have only limited volume and ability to absorb water. This causes selective erosion of soil from the deep grooves. The rainwater or irrigation water runs freely on the compacted soil between the deep tilled rows; run-off water rich in fertilizers and top soil pollutes lakes and rivers.

A number of prior art patents disclose coulters of different geometry and harrowing tools. For example, U.S. Pat. No. 369,163 to Clark discloses a disk harrow: U.S. Pat. No. 1,954, 783 to Bohmker discloses a disk blade; U.S. Pat. No. 4,538, 688 to Szucs et al, discloses fluted coulter blade and U.S. Pat. No. 5,649,602 to Bruce discloses wavy coulter.

There remains a need in the art for a tillage system that deep-tills at the planting rows so that planted seeds grow easily and vigorously. The entire field should not be deep-tilled, since deep-tilling everywhere results in water run-offs that produce soil erosion and fertilizer loss with consequent pollution of rivers and water ways. There is need in the art for a tilling system that clears plant debris, including stocks, sufficiently to leave behind a field with a clean-tilled appearance and minimal soil disturbance between the deep-tilled rows and which provides sufficient water absorption and storage to prevent water run-offs and consequent soil erosion. There is a further need in the art for a tillage system that can be readily added-on to existing devices and tools.

SUMMARY OF THE INVENTION

The present invention provides an add-on tillage system that can be added-on to existing agricultural devices and tools for tilling. The present invention provides a tillage add-on device adapted to till a field in spring prior to planting and in fall after harvesting farm crops for primary tillage. The system of this invention includes a plurality of spaced first deep tilling tines that plough the field deep along planting rows. A plurality of spaced rows of shallow tilling tines positioned in front of and mostly behind the deep tilling tines in the moving direction of the tiller smoothen the ground adjacent to the deep tilled location and clear the debris on the land segments between the deep tilled planting rows. This creates a field that appears tilled, rather than a field which, despite having been deep tilled, retains unsightly plant stocks and weed residue between the deep tilled locations. The last row of shallow tilling coulter is always provided that has a ruffled disk pushes debris such as plant stocks into the ground, thereby mixing and anchoring tilled soil between the deep-tilled groves and preventing water run-off and consequent soil erosion. A third set of tools has a series of harrows, cage rollers or packer wheels may be used behind the shallow tilling ruffled disks to smoothen the soil surface.

In a first embodiment, the add-on tillage system includes a tilling unit having a common tool bar having attached thereto a first set of a plurality of tilling tines or coulters adapted to produce deep grooves in a tilled field. Means are provided for adjusting spacing between the tines or coulters, tilling tines or coulters up and down as a group being loaded by spring force, compressed air pistons or hydraulically actuated rams. A first mount is adapted to receive a tongue with hydraulic operations for mounting to a tractor. A second mount is adapted to receive a tongue with hydraulic mount to an agricultural device adapted to be pulled by the tractor. The add-on tillage system tills surface soil for a clean appearance, providing improved rain/irrigation water absorption, eliminating water run-off and erosion.

The tillage system has a tool bar that carries a plurality of deep tilling tines with inserted hardened steel projections adapted to till the ground along a plurality of planting rows. Due to the large diameter of these deep-tilling tines, the depth of till may be adjusted from about 5 inches to 12 inches for fall tilling and from 5 to 8 inches for spring tilling. Such an adjustment is easily made by changing the location of an individual attachment bar loaded by spring, air pressure or a hydraulic ram, which connects the deep tilling cutters to the tool bar. This first set of deep-tilling tines may be driven at a tilling ground speed selected by the operator. When a deep tilling tine comes across a hard object such as rock, the loading mechanism yields, thereby preventing damage to the deep tilling tines. The deep tilling tines unearth weeds and bring to the top of the soil any plant roots present there within. As a result of this deep tilling, deep grooves are formed in the field. These grooves are bound by two mounds of soil, one mound being located to either side of the deep groove. The deep tilling tines may be made with a number of structural configurations including toothed tines with lateral and radial extensions, three dimensionally formed ruffled coulters and other geometric shapes all designed to deep till to a depth of 5 to 12 inches. If deeper depth is required for different soil types, the diameter of the deep tillage tine will be increased. Unless disturbed, the land segments between the deep grooves would remain essentially untilled and exhibit an unsightly appearance. A conventional tilling system does not have these shallow tilling tines or coulters such as that disclosed in U.S. Pat. No. 7,575,066 to Bauer strictly produces the tilling of deep grooves at the plant rows. Irrigation of the field occasioned by rain or artificial irrigation causes water to collect within the deep grooves. The deep grooves have limited volume, which limits their ability to absorb water into the field. Moreover, the mounds formed to either side of the grooves typically contain high quality topsoil, which tends to be washed off, carrying fertilizer that was previously applied, and producing soil erosion. The ability of water to be absorbed in the untilled portion of the field between the deep tilled grooves is very limited and most of the water supplied by rain or artificial irrigation runs off from the field due to soil compaction without benefiting the planted crop.

The present invention uses plurality of sets of shallow, nominally vertical coulters that are placed directly behind as well as in front of the deep tilling tines at adjustable, selected distances. The shallow tilling coulters may be dispersed in several rows, some in front of the deep tilling tines and some always behind the deep tilling tines and may have several shapes. The coulters may be in the form of toothed tine rotors or rotors with a ruffled structure. These shallow tilling coulters have no specific spacing relation to the spacing of the deep tilling tines, and are generally present in a much greater number than the number of deep tilling tines employed. When a shallow tilling coulter is placed in front of the deep tilling tines, it functions to size the crop residue and clear the ground facilitating smooth operation of the deep tilling tines. All the shallow tilling tines are run at the ground speed of the tillage system. The depth of till for the shallow till coulters is adjusted by moving the coulter wheels up or down. This adjustment is effected by the operator of the tillage system, and is nominally in the 1 to 4 inches range. The shallow tilling coulters thus clear most of the plant debris in the field between the deep tilled grooves. They also stir and mix the soil. Preferably, the shallow tilled portions of the field tilled by the coulters only disturb the soil slightly providing space for the water absorption from rain or artificial irrigation. Water run-off is substantially prevented. The field provided by the tilling practice of the present invention exhibits a neat appearance characterized by the removal of perennial weeds previously extant between the deep tilled grooves. The tool bar may be increased in width by adding a set of hydraulic folding wings that carry the similar arrangement of tines.

For example, a typical tillage system has a first row of deep tilling tines, the second row of curved coulters designed to displace the tilled soil laterally perpendicular to the movement direction. These curved coulters may be lifted off above the ground when not needed. A third row of shallow tilling toothed coulters is provided the orientation of which is set from zero to 10 degrees with respect to the travel direction of the tillage system. The inclined toothed shallow tilling coulters displace soil laterally eliminating mounds and mixing plant debris with the soil in a manner similar to curved coulters and may function better in some soils or crop fields. A last fourth row of ruffled disks shallow tilling coulters is always provided to mix the plant debris into the tilled ground, binding the soil from water erosion. A fifth row of soil surface smoothening tools such as harrow tools, cage roller tool or packer wheels may be provided. A shallow tilling toothed coulter may be additionally added in front of deep tilling tines to size tall plant debris in the field enabling tilling deep tilled grooves in the field more easily. The number of shallow tilling coulter and its order may be changed according to the needs of field being tilled.

Advantageously, the tillage system of the present invention leaves behind a clean tilled field with very little or no unsightly weeds and a plurality of deep tilled grooves for row planting of a crop. The deep tilled grooves do not have mounds on either side thereof due to the tilling action of the shallow tilling coulters. In addition, the field surface is well leveled and free from water running channels, a key feature that prevents water runoff.

Significant advantages are realized by practice of the present invention. The key elements of the tillage system of the present invention comprise, in combination, the features set forth below:

1) a tool bar carrying a plurality of tool frames with adjustable spacing and the ability to lower or raise the tool frame individually;

2) one of the tool frame having rotatable deep tines that is rotated at the tillage system ground speed selected by the operator;

3) the deep tilling tines being inserted into the field for a depth of approximately 5 to 12 inches for fall tilling, and 5 to 8 inches for spring use, respectively and loaded by spring force, compressed air pistons or hydraulically actuated rams;

4) several of the tool frames carrying a second set of multiple rows of shallow tilling coulters, some always placed behind the deep tilling tines and some optionally placed in front of the deep tilling tines, the shallow tilling coulters being present in greater number than the deep tilling tines and being spaced apart with no specific special relationship to the deep tilling tines;

5) the shallow tilling coulters disturbing the soil for a depth of about 1 to 4 inches clearing plant debris between deep tilled grooves;

6) a last set of ruffled disk shallow coulters provided to mix and incorporate plant debris into the soil;

7) the tool bar optionally having a tool frame that carries a set of harrow tools, cage roller tools or packer wheels for smoothening the soil surface;

8) the add-on device provides the ability to provide tilling functions to a plethora of agricultural devices;

9) the add-on device may further include direct fertilizer delivery behind the tillage tines;

whereby the shallow tilling tines smoothen the tilled soil surface, eliminating the mounds formed on the sides of the deep groove generated by the deep tilling tines, and remove plant debris between the deep tilled grooves, creating a clean tilled field appearance, so that the shallow tilled regions provide sufficient water absorption for rain or irrigation water, substantially eliminating water run-off, as well as soil erosion.

BRIEF DESCRIPTION OF THE DRAWING

The invention will be more fully understood and further advantages will become apparent when reference is had to the following detailed description of the preferred embodiments of the invention and the accompanying drawing, in which:

FIG. 2a is a plan view of an embodiment of the add-on tillage system added onto a vertical till and mounted on a tractor;

FIG. 3 is a plan view of an embodiment of the add-on tillage system added onto a short disk harrow and mounted on a tractor;

FIG. 5 is a plan view of an embodiment of the add-on tillage system added onto a reel disk and vertical till combo and mounted on a tractor;

FIG. 6 is a plan view of an embodiment of the add-on tillage system added onto a disk ripper and mounted on a tractor;

FIG. 8a is a plan view of an embodiment of the add-on tillage system showing mounting to an agricultural device;

FIG. 8b is an exploded view of FIG. 8a showing mounting of the add-on tillage system to the agricultural device;

FIG. 9 is a plan view of an embodiment of the add-on tillage system showing mounting means;

DETAILED DESCRIPTION OF THE INVENTION

Figure 1A:
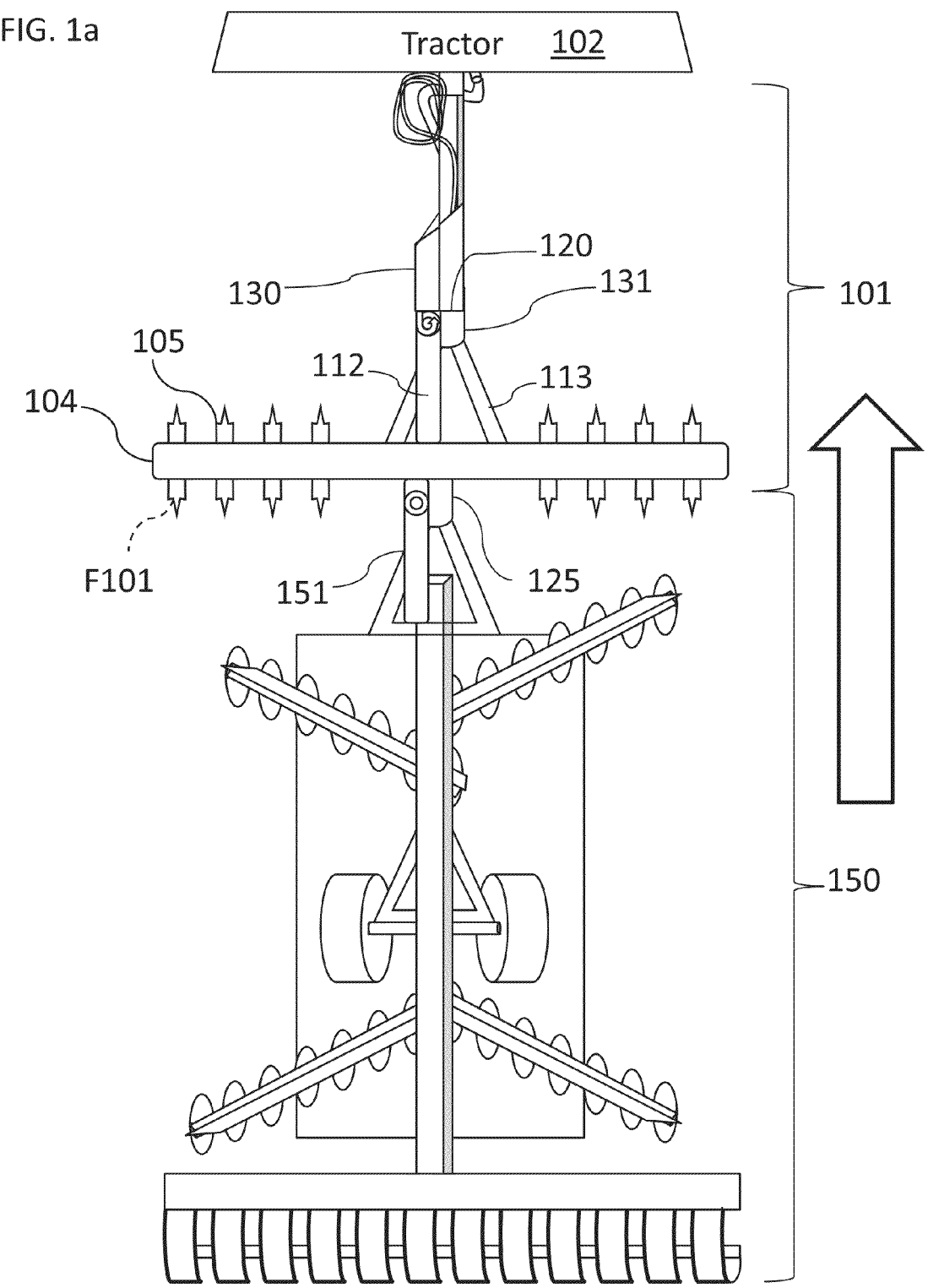
FIG. 1a is a plan view of an embodiment of the add-on tillage system added onto a conventional disk harrow and mounted on a tractor.

This invention relates to a tilling system adapted to be added-on to existing agricultural devices, including vertical tilling, vertical combination, horizontal and conventional tilling and fertilizer machinery. The add-on tilling system generally comprises a tool bar that carries a plurality of tillage tools, preferably comprising deep tilling tines, each being adjustable in spacing and adapted to be lowered or raised above the ground. The tool frame preferably carries a row deep tilling tine, however it is noted that a plethora of different tilling coulters can be utilized. All of the deep tilling tines and shallow tilling coulters run at the ground speed of the tillage system selected by the tillage system operator.

The subject tilling system provides the ability to readily convert agricultural tools or devices to include deep tillage by adding the subject tilling system/unit to the existing separate agricultural device. For example, the following agricultural devices are contemplated to receive the add-on tilling system of the subject invention to provide for deep tillage: vertical till (waffle coulters); vertical till (curved coulter); reel disk; short disk harrows; disk rippers; disk and vertical till combination devices; and conventional disk harrow devices. As an alternative embodiment, folding wings may be integrated within the subject tilling add-on device/tilling system. Additionally, the tilling system may further include fertilizer delivers via direct fertilizer placement of liquid or dry fertilizer.

Add-on of the subject tilling system is achieved by removing the tongue from the mount of the agricultural device and adding the add-on tiling system to the mount of the agricultural device. In turn, the tongue is replaced on a mount in the front of the deep tillage system so that the agricultural device is converted to include the tilling system. Various tillage systems can be utilized. For example, the subject add-on tilling system may provide a deep tillage having curved cog wheels, generally having a depth ranging from about 3 inches to 4 inches. Such devices contemplated for use with deep tillage cog wheels include conventional disk devices. In another embodiment, add-on of the subject tilling system may be achieved by replacing out tines with deep tillage wheals.

The depth to which the deep tilling tines of the subject add-on tillage system penetrate the ground is selected by the operator by adjusting a spring loaded, compressed air piston loading or hydraulically actuated ram loading of the individual tool frames typically in the range of 5 to 12 inches for fall or primary tilling and typically in the range of 5 to 8 inches for spring or finish tilling. The deep tillage tine wheels have protrusions in the form of teeth with replaceable inserts made from hardened steel and cut through the soil forming deep grooves. This groove forming action displaces soil in the form of two mounds that pile up on either side of the deep groove. This deep tilling action is selected to be nominally located at a planting location that is designed for planting seeds in rows. Deep tilling is generally carried out during spring planting and fall to shatter and loosen soil. It can also be carried out during the fall planting time to clear the plane debris at the end of harvest season. Such deep tilling loosens the soil, promoting seed growth. Each of the deep grooves formed by the deep tilling operation has only a small volume. Substantial quantities of rainwater or irrigation water tend to run-off before any absorption in the field occurs. This results in widening of the deep grooves, producing erosion and further increasing chances for run-off. Moreover, the mound formed around the deep grooves, containing premium topsoil, often times washes off from the field, creating topsoil loss.

In one embodiment, the tillage system uses a second set of shallow tilling coulters which are greater in number than twice the number of deep tilling tines and are mounted on the tool bar separately as a gang of shallow tilling coulters. The number of shallow tilling coulters can vary in accordance with the spaces between the deep tilling tines. Typically, the ratio of the number of shallow tilling coulters to that of the deep tilling tines ranges from 2.1 to 4. The set of shallow tilling coulters may be lowered or raised to select a desired tilling depth, typically in the range of 1 to 4 inches. The passage of the shallow tilling coulter tines directly behind the deep tilling tines smoothens all the mounds created on the sides of the deep groove formed by the deep tilling tines. In addition, the shallow tilling coulter tines clean up the area between the deep tilled grooves, eliminating any weed residue including perennial weeds and creating a clean tilled field appearance. When rainwater or irrigation water falls on the field, the tilled portions between the deep grooves have significantly increased water absorption volume. This enables the rainwater or irrigation water to be absorbed within the field. The water run-off and soil erosion are significantly reduced or substantially eliminated, thereby preventing waterways pollution or contamination.

The deep tilling tine wheels may be lowered into the soil to a typical depth of about 5 to 12 inches for fall or primary tilling and 5 to 8 inches for spring or finish tilling. The soil is deep tilled by these deep tilling tine wheels, which loosen the soil for enhanced plant growth. Deep tilling creates a groove with mounds on either side thereof. The small volume of the deep groves in the field is insufficient to prevent water run-off during a rainstorm or water irrigation. This problem is ameliorated by a second set of shallow tilling coulter tines, which follow the deep tilling tines to quickly smoothen the mounds and thereby create a field that is substantially smooth. The shallow tilling coulters also clear plant debris between the deep grooves in the field, creating a pleasant tilled field appearance that is free from rows of weed patches.

Figure 1B:
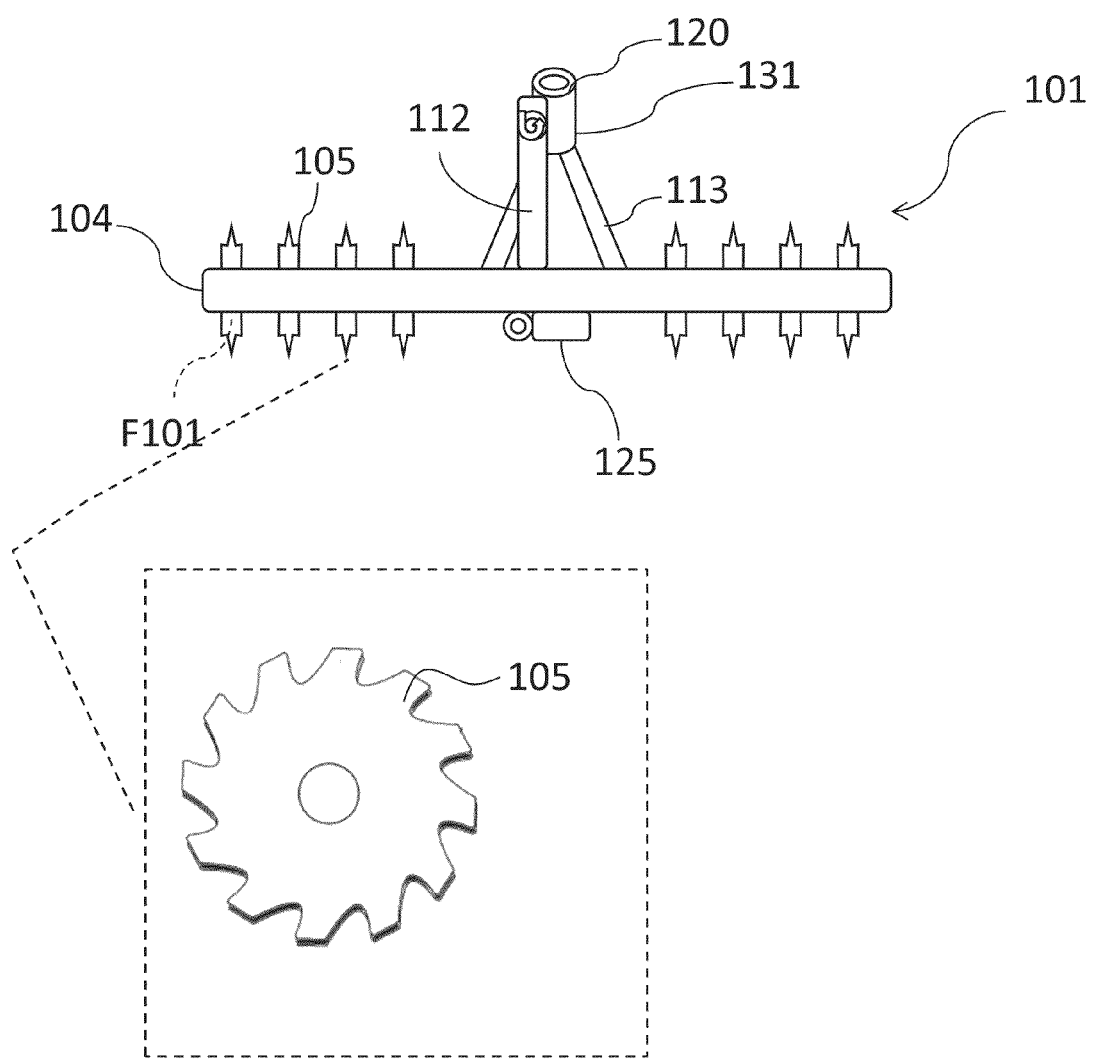
FIG. 1b is a plan view of an embodiment of the add-on tillage system prior to mounting on the conventional disk harrow and/or tractor.
Figure 1C:
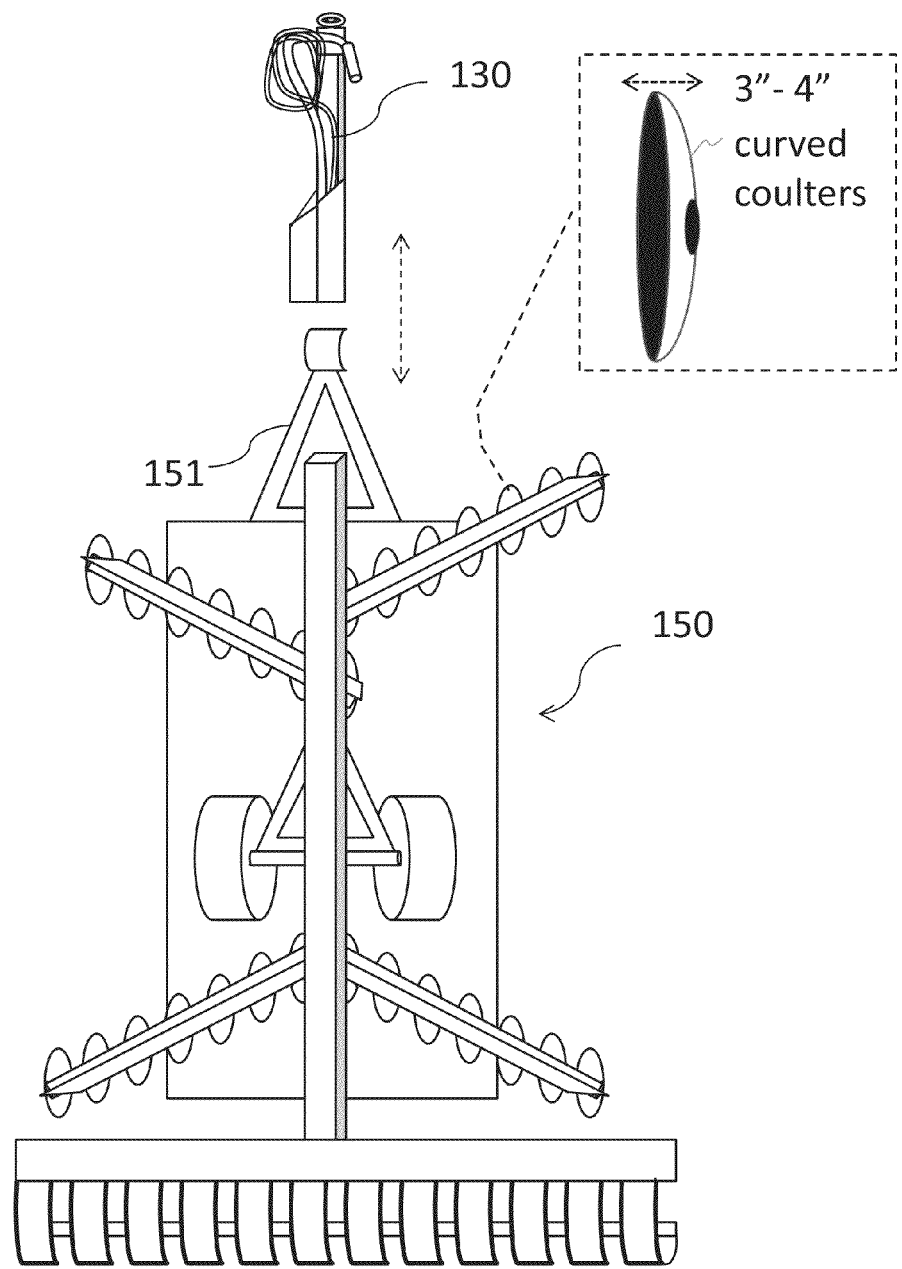
FIG. 1c is a plan view of the conventional disk harrow prior to mounting on the subject add-on tillage system.

FIGS. 1a-1c illustrate plan views of an embodiment of the add-on tillage system added onto a conventional disk harrow and mounted on a tractor. FIG. 1a illustrates generally at 110 a plan view of an embodiment of the add-on tillage device mounted on a tractor and mounted on a conventional disk harrow. FIG. 1b illustrates the add-on tillage device un-mounted from both the tractor and the conventional disk harrow as a stand-alone add-on device. It is noted that the device is capable of being mounted on a plethora of agricultural devices.

Referring to FIGS. 1a-1c, the tillage system comprises an add-on tillage unit 101 that is adapted to be mounted on a tractor 102. The tractor truck moves in the direction of the arrow. The tillage unit 101 has a common tool bar 104, which carries at least one tool frame herein shown as F101. The common tool bar 104 may carry more than one tool frame (F101-F10N; N being an integer preferably 2 through 5). The tillage unit 101 is attached to tractor 102 using the mounting hitch 130 carried by a shaft 131. Common tool bar 104 has a first set of a plurality of tilling tines 105 attached thereto that are adapted to produce deep grooves in a tilled field. Preferably, deep tilling tines 105 are utilized as shown in FIG. 1b. Deep tilling tines are illustrated in FIG. 1b, as well as generally in FIGS. 12 and 14. In an alternative embodiment, the first set of a plurality of tilling tines or coulters are commercial coulters with a diameter to till 5 to 12 inches and shatter soil. The common tool bar 104 connects to a first tool bar segment 112. A depth of penetration adjustment means, element 113, is connected to first tool bar segment 112 and this adjustment means is selected from the group consisting of a spring force, compressed air pistons or hydraulically actuated rams. The element 113 controls the depth of penetration of the plurality of deep tilling tines 114 of the first tool frame F101 to raise or lower the deep tilling tines as a group. In the embodiment shown, deep tillage tine wheels 114 are shown. Preferably, these tine wheels 114 have a depth ranging from about 3 inches to 4 inches. The penetration depth of the deep tilling tines typically ranges from about 5 to 12 inches for fall or primary tilling and 5 to 8 inches for spring or finish tiling. The operator of the tillage system also controls the rotational speed of these deep tilling wheels by the speed of movement of the tillage system. Deep tilling tines 114 are shown. In an alternative embodiment, the deep tilling tines 114 may instead be different tillage disks and/or coulters or combinations thereof. For example, the tilling tines 114 may be shallow curved coulters (i.e. having a depth of about 2 inches) with or without waffle edges. (See FIGS. 12-15 for examples of tilling tine embodiments/coulters contemplated for use in constructing the add-on tillage system).

The common tool bar 104 has a first mount 120 adapted to receive tongue 130 with hydraulic mount for mounting to the tractor 102 or power generating agricultural device. Additionally, the common tool bar 104 has a second mount 125 adapted to receive a tongue 151 for mounting to an agricultural device, herein shown as a conventional disk harrow 150 so that the add-on tillage unit 101 and conventional disk harrow 150 are adapted to be pulled by the tractor 102 or power generating agricultural device. Thus, the add-on tillage unit 101 provides the ability to further provide tilling ability to the conventional disk harrow 150 so that the add-on tillage system tills surface soil for a clean tilled field appearance, providing sufficient water absorption for rain or irrigation water, substantially eliminating water run-off, as well as soil erosion. In operation, the tongue 130 is removed from the conventional disk harrow 150 and is replaced on the deep tillage/add-on tillage unit 101 for mount to the tractor 102. In turn, conventional disk harrow 150 is then mounted on the deep tillage/add-on tillage unit 101.

Figure 10:
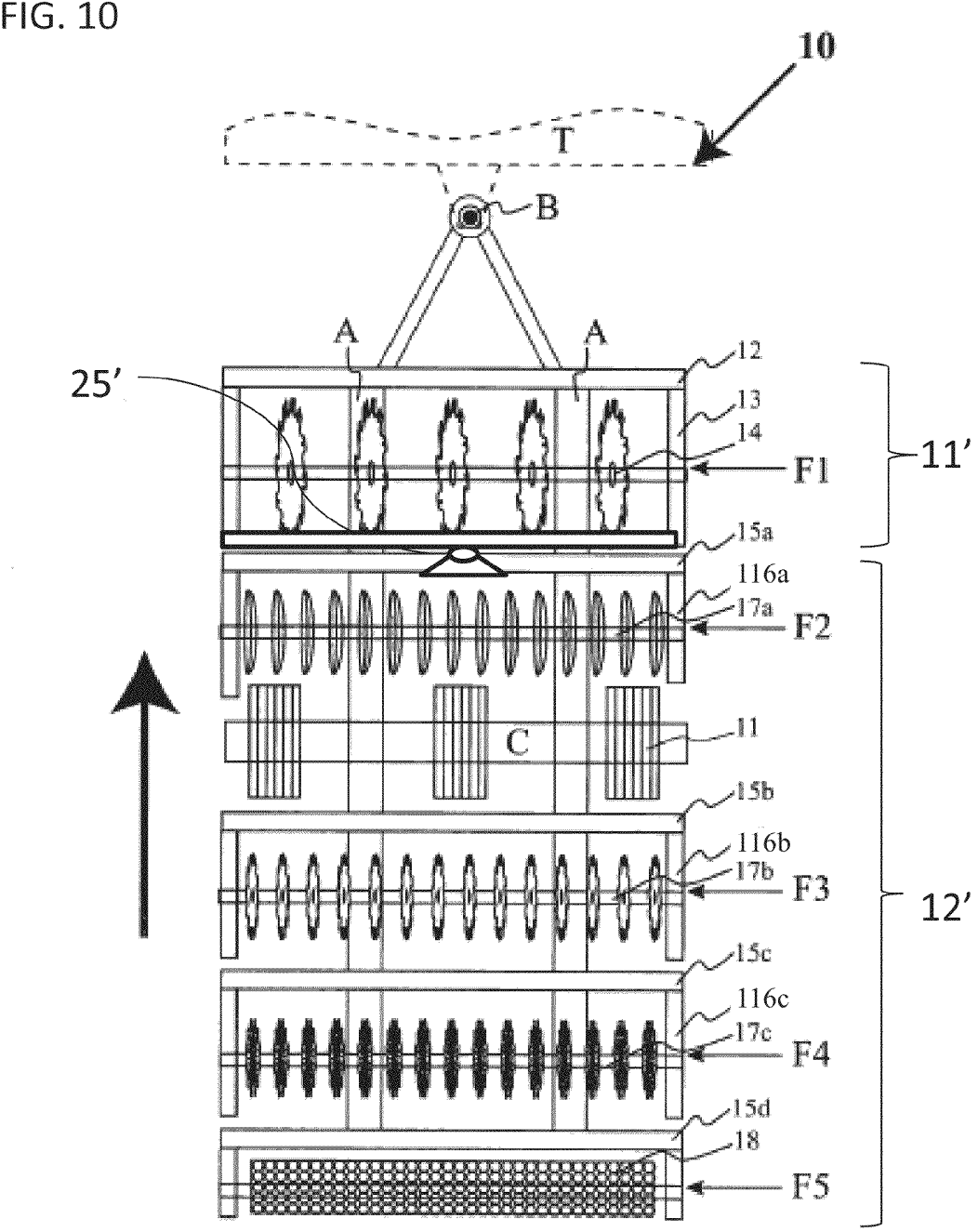
FIG. 10 is a plan view of a typical tillage schematically illustrating a plurality of sets of shallow tilling coulters placed behind a first set of deep tilling tines.

In an alternative embodiment, the common tool bar 104 is further adapted to connect to a second tool bar segment (not shown; see FIG. 10). A depth of penetration adjustment means, element, is connected to second tool bar segment and this adjustment means is selected from the group consisting of a spring force, compressed air pistons or hydraulically actuated rams. The element controls the depth of penetration of the plurality of shallow tilling curved coulters of a second tool frame to raise or lower the shallow tilling curved coulters as a group. The shallow tilling curved coulters penetrate the ground as a group from 1 to 4 inches and push the tilled soil laterally. In fields that do not require this function, the curved coulters may be raised above the ground. The operator selects the rotational speed of these shallow tilling curved coulters by the translational speed of the tilling system. The common tool bar may further connect additional tool bar segments (as for example discussed in FIG. 10). Shallow tilling ruffled coulters may be utilized to incorporate plant debris within the tilled soil, reducing soil erosion by rain water or irrigation water. The operator selects the rotational speed of these shallow tilling toothed coulters by the translational speed of the tilling system. The shallow tilling curved coulters, inclined toothed coulters as well as the ruffled coulters displace and smoothen mounds formed around deep tilled grooves, leaving behind a smooth tilled field. The tilling load for the deep tilling tines and the shallow tilling coulters is applied by conventional means, such as spring force, compressed air pistons or hydraulically actuated rams. The element 113 contains a spring loading device, compressed air pistons and hydraulic cylinder providing height adjustment of deep tilling tines and coulters. The tillage system tool bar may carry an optional segment that carries a tool frame that carries tillage tools such as harrow tools, cage rollers or packer wheels.

Figure 2B:
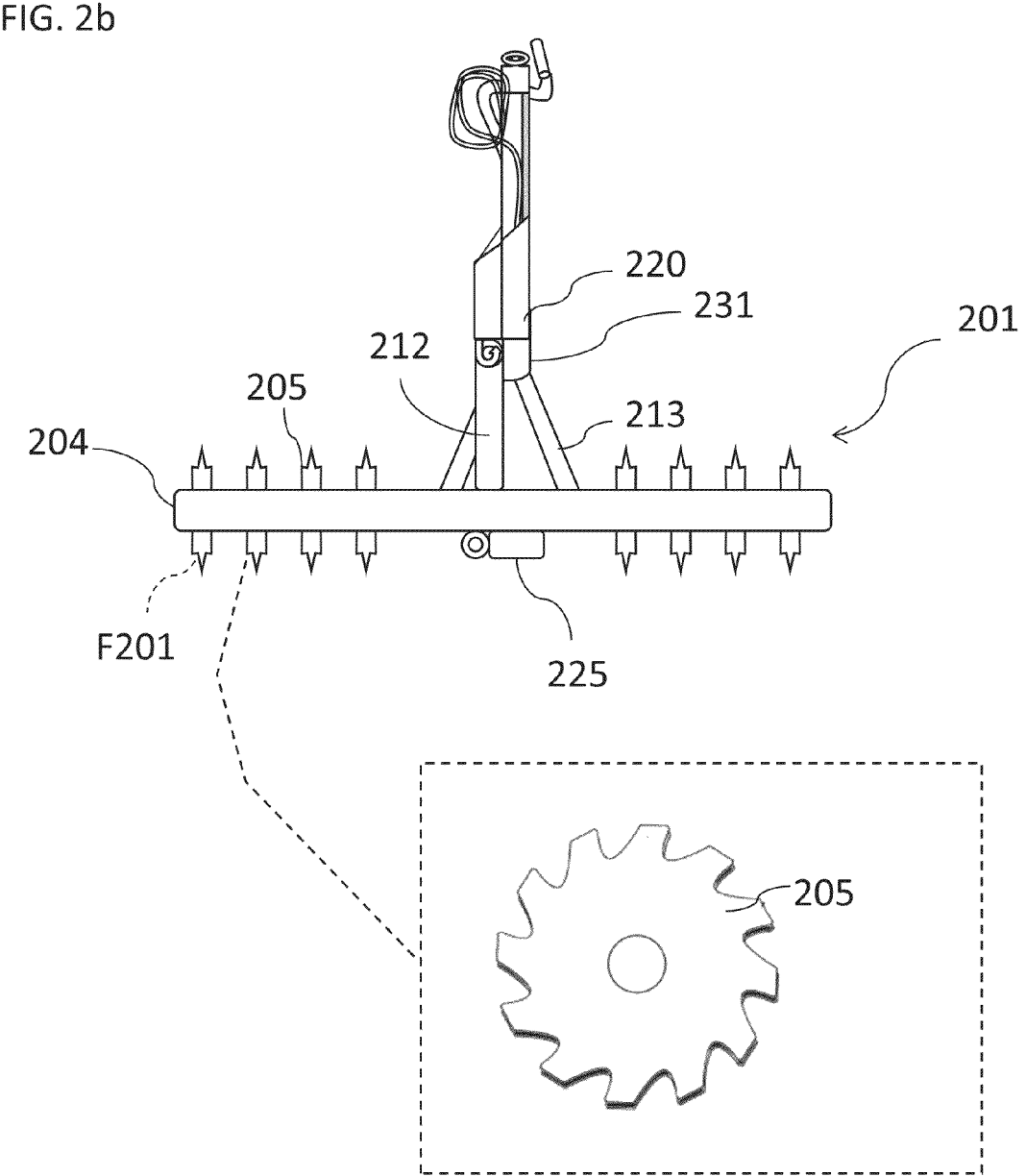
FIG. 2b is a plan view of an embodiment of the add-on tillage system prior to mounting on the vertical till and/or tractor.
Figure 2C:
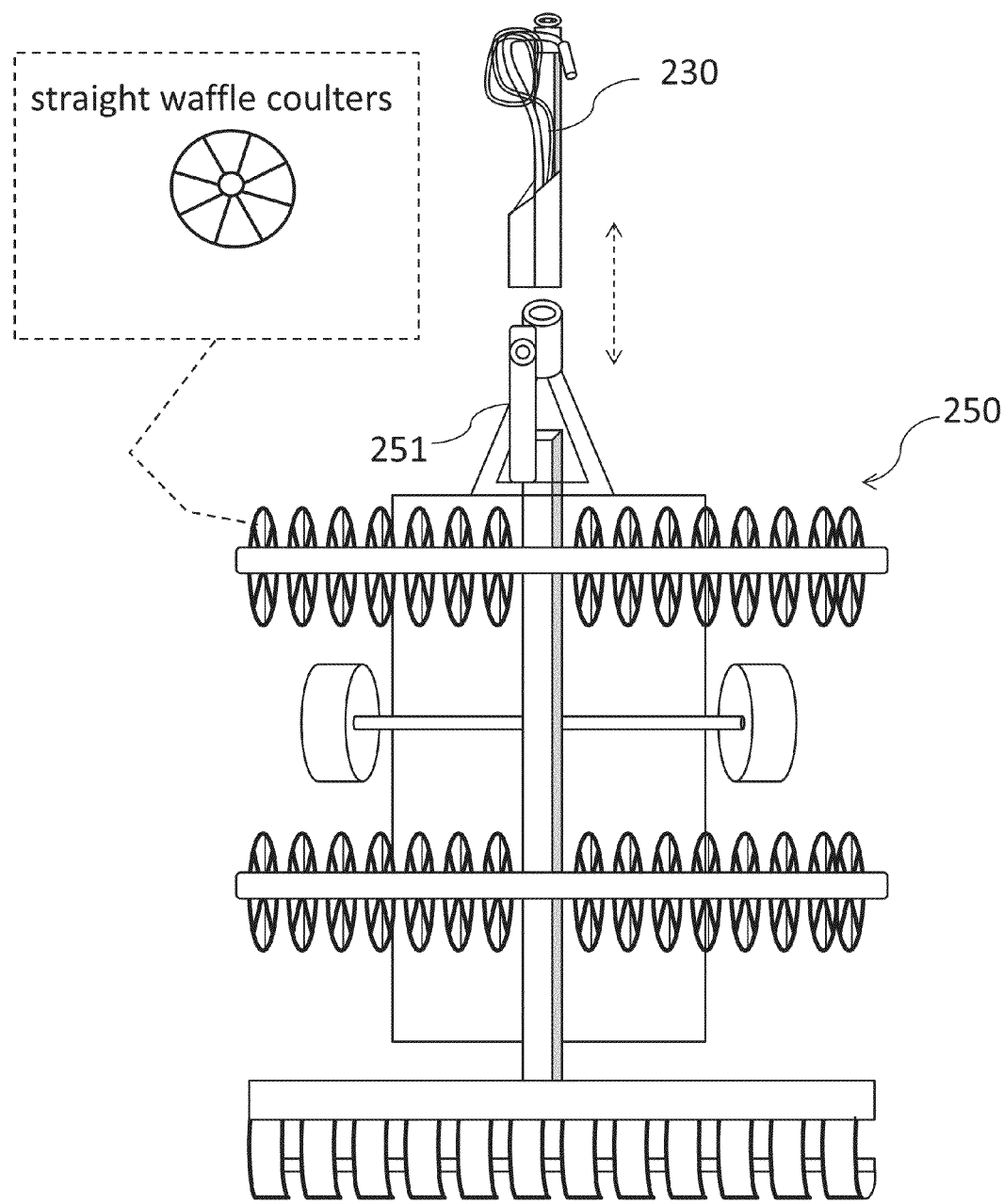
FIG. 2c is a plan view of the vertical till prior to mounting on the subject add-on tillage system.

FIGS. 2a-2c illustrate views of the add-on tillage system on a vertical till. Specifically, FIG. 2a is a plan view of an embodiment of the add-on tillage system added onto a vertical till and mounted on a tractor; FIG. 2b is a plan view of an embodiment of the add-on tillage system prior to mounting on the vertical till and/or tractor: and FIG. 2c is a plan view of the vertical till prior to mounting on the subject add-on tillage system. Referring to FIGS. 1a-1c, the tillage system comprises an add-on tillage unit 201 that is adapted to be mounted on a tractor 202. The tillage unit 201 has a common tool bar 204, which carries at least one tool frame herein shown as F201. The common tool bar 204 may carry more than one tool frames (F201-F20N; N being an integer preferably 2 through 5). The tillage unit 201 is attached to a tractor 202 using the mounting hitch 230 carried by a shaft 231. Common tool bar 204 has a first set of a plurality of tilling tines or coulters 205 attached thereto that are adapted to produce deep grooves in a tilled field. Preferably, deep tilling tines 205 are utilized. In an alternative embodiment, the first set of a plurality of tilling tines or coulters are commercial coulters with a diameter to till 5 to 12 inches and shatter soil. The common tool bar 204 connects to a first tool bar segment 212. A depth of penetration adjustment means, element 213, is connected to first tool bar segment 212 and this adjustment means is selected from the group consisting of a spring force, compressed air pistons or hydraulically actuated rams. The element 213 controls the depth of penetration of the plurality of deep tilling tines 205 of the first tool frame F201 to raise or lower the tilling tines as a group. In the embodiment shown, straight waffle coulters 214 are shown. The common tool bar 204 has a first mount 220 adapted to receive a tongue 230 with hydraulic mount for mounting to the tractor 202 or power generating agricultural device. Additionally, the common tool bar 204 has a second mount 225 adapted to receive a tongue for mounting to an agricultural device, herein shown as a vertical tillage 250. In operation, the tongue 230 is removed from the vertical tillage 250 and is replaced on the deep tillage/add-on tillage unit 201 for mount to the tractor 202. In turn, vertical tillage 250 is then mounted on the deep tillage/add-on tillage unit 201.

Figure 4:
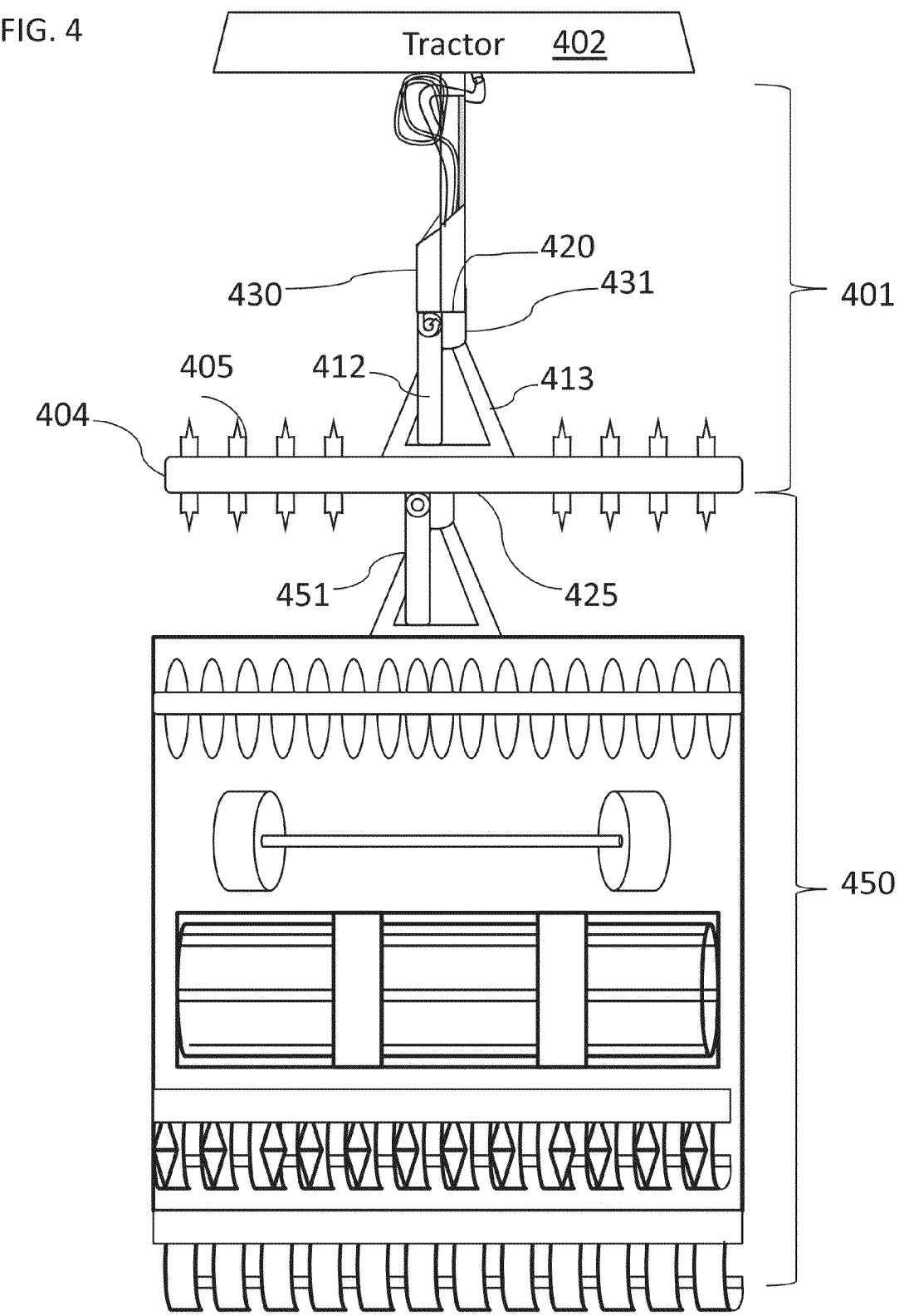
FIG. 4 is a plan view of an embodiment of the add-on tillage system added onto a reel disk and mounted on a tractor.

FIG. 3 is a plan view of an embodiment of the add-on tillage system 301 added onto a short disk harrow 350 and mounted on a tractor 302 via tongue 330 removed from the short disk harrow 350. FIG. 4 is a plan view of an embodiment of the add-on tillage system 401 added onto a reel disk 450 and mounted on a tractor 402. FIG. 5 is a plan view of an embodiment of the add-on tillage system 501 added onto a reel disk and vertical till combo 550 and mounted on a tractor 502. Each of the devices in each of these embodiments is constructed and operates as discussed hereinabove regarding FIGS. 1 and 2 and is shown as a representative example.

Figure 7A:
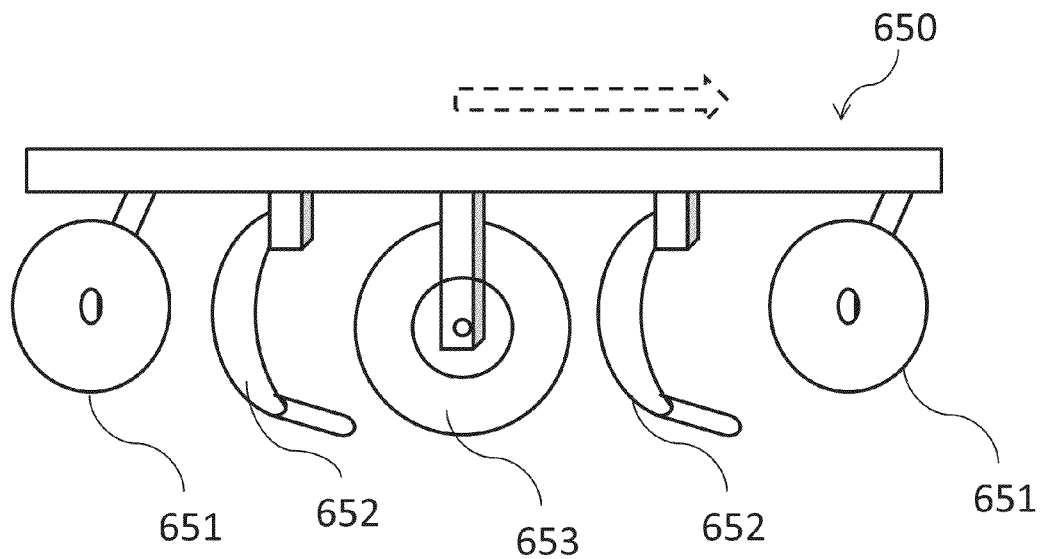
FIG. 7a is a plan view of an embodiment of the add-on tillage system wherein deep tillage tines are provided that are removable for replacement and interchangeability with deep tillage wheals.
Figure 7B:
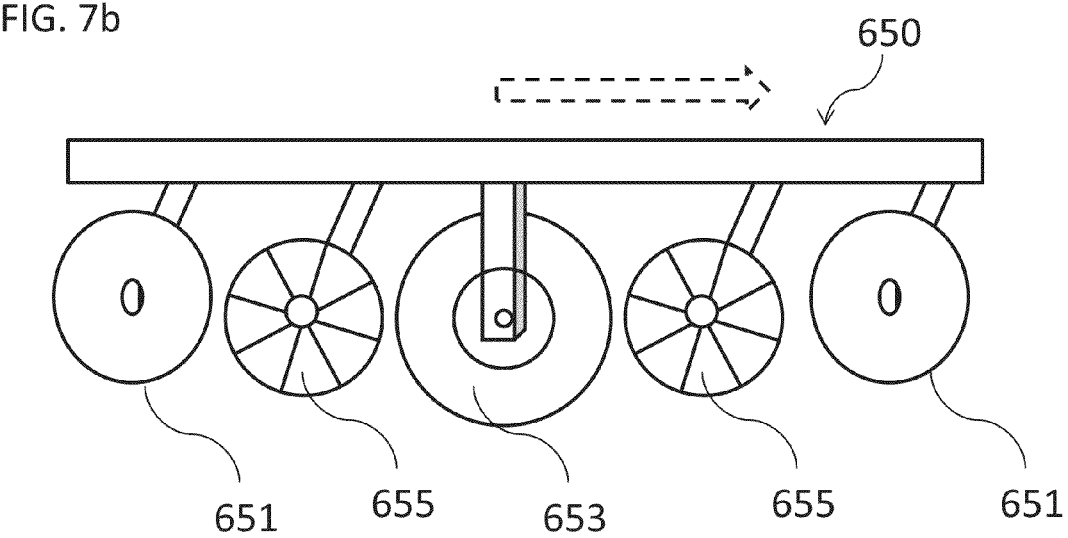
FIG. 7b is a plan view of the embodiment of FIG. 7a with deep tillage wheels replacing deep tillage tines.

FIG. 6 is a plan view of an embodiment of the add-on tillage system added onto a disk ripper and mounted on a tractor. FIG. 7a is a plan view of an embodiment of the add-on tillage system wherein deep tillage tines are removable for replacement and interchangeability with deep tillage wheels. FIG. 7b is a plan view of the embodiment of FIG. 7a with deep tillage wheals replacing deep tillage tines. Referring to FIGS.

6, 7a and 7b, a disk ripper 650 is shown having curved coulters 651, deep tillage tines (10 inches to 16 inches deep) 652 and wheels 653. The arrangement is shown via a side view in FIG. 7a. As indicated in a side view in FIG. 7b, deep tillage tines 652 are adapted to be removed and replaced or interchanged with deep tillage wheels 655.

FIGS. 8a and 8b show mounting arrangements for mounting the add-on tillage system/unit to an agricultural device. FIG. 8b is an exploded view of FIG. 8a showing mounting of the add-on tillage system to the agricultural device. Add-on tillage unit 801 includes common tool bar 804 having a first mount 820 adapted to receive a tongue with hydraulic mount for mounting to the tractor or power generating agricultural device. Additionally, the common tool bar 804 has a second mount 825 adapted to receive a tongue for mounting to an agricultural device 850 so that the add-on tillage unit 801 and agricultural device 850 are adapted to be pulled by the tractor 802 or power generating agricultural device.

FIG. 9 is a plan view of an embodiment of the add-on tillage system showing mounting means. Add-on tillage unit 901 includes common tool bar 904 having a first mount 920 adapted to receive a tongue with hydraulic mount for mounting to a tractor or power generating agricultural device. Additionally, the common tool bar 904 has a second mount 925 adapted to receive a tongue for mounting to an agricultural device so that the add-on tillage unit 901 and agricultural device are adapted to be pulled by the tractor or power generating agricultural device.

The subject add-on tillage system may further be utilized by add-on to a fertilizer device, wherein the fertilizer is adapted to be placed directly behind the deep tillage wheel of the add-on unit for dry or liquid fertilizer delivery. The direct placement of the fertilizer directly behind the deep tillage wheel has been unexpectedly and surprising found to save up to forty percent on fertilizer usage.

FIG. 10 illustrates generally at 10 a plan view of a typical add-on tillage unit according to the present invention. The tillage system comprises a tillage unit 11' with a tractor hitched to it along with an agricultural device 12' mounted thereto at 25'. The tractor truck moves in the direction of the arrow. The tillage unit 11' has a common tool bar A, which carries a tool frame F1: the agricultural device 12' has a common body carrying tool frames F2, F3, F4 and F5. The tillage unit 11' is attached to a tractor T using the hitch B and attached to the agricultural device 12' via hitch/mount 25' which in turn is carried by a set of front support wheels 11 with a shaft C. The common tool bar A connects to a first tool bar segment 12. A depth of penetration adjustment means, element 13, is connected to first tool bar segment 12 and this adjustment means is selected from the group consisting of a spring force, compressed air pistons or hydraulically actuated rams. The element 13 controls the depth of penetration of the plurality of deep tilling tines 14 of the first tool frame F1 to raise or lower the deep tilling tines as a group. The penetration depth of the deep tilling tines typically ranges from about 5 to 12 inches for fall or primary tilling and 5 to 8 inches for spring or finish tiling. The operator of the tillage system also controls the rotational speed of these deep tilling wheels by the speed of movement of the tillage system. The common tool bar A may connect to a second tool bar segment. The agricultural device's 12' common tool bar connects to a segment 15a. A depth of penetration adjustment means, element 116a, is connected to second tool bar segment 15a and this adjustment means is selected from the group consisting of a spring force, compressed air pistons or hydraulically actuated rams. The element 116a controls the depth of penetration of the plurality of shallow tilling curved coulters 17a of the second tool frame F2 to raise or lower the shallow tilling curved coulters as a group. The shallow tilling curved coulters penetrate the ground as a group from 1 to 4 inches and push the tilled soil laterally. In fields that do not require this function, the curved coulters may be raised above the ground. The operator selects the rotational speed of these shallow tilling curved coulters by the translational speed of the tilling system. The common tool bar of agricultural device 12' connects to a third tool bar segment 15b. A depth of penetration adjustment means, element 116b, is connected to third tool bar segment 15b and this adjustment means is selected from the group consisting of a spring force, compressed air pistons or hydraulically actuated rams. The element 116b controls the depth of penetration of the plurality of shallow tilling toothed coulters 17b of the third tool frame F3 to raise or lower the shallow tilling toothed coulters as a group. The tool frame F3 of shallow tilling toothed coulters or waffle coulters 17b extends behind the shallow tilling curved coulters 17a. The element 116b controls the depth of penetration of the plurality of shallow tilling toothed coulters 17b of the third tool frame F3 to raise or lower the shallow tilling toothed coulters as a group to penetrate the ground from 1 to 4 inches. The orientation of the shallow tilling toothed coulters may be selected from 0 degrees (along the translation direction of the tillage system) or 10 degrees with respect to this translation direction. When the shallow tilling toothed coulter is inclined, it pushes the tilled soil laterally in a direction perpendicular to the tilling system translation direction in a manner similar to the shallow tilling curved coulters. The operator selects the rotational speed of these shallow tilling toothed coulters by the translational speed of the tilling system. The common tool bar of agricultural device 12' connects to a fourth tool bar segment 15c. A depth of penetration adjustment means, element 116c, is connected to fourth tool bar segment 15c and this adjustment means is selected from the group consisting of a spring force, compressed air pistons or hydraulically actuated rams. The element 116c controls the depth of penetration of the plurality of shallow tilling ruffled coulters 17c of the fourth tool frame F4 to raise or lower the shallow tilling ruffled coulters as a group. The tool frame F4 of shallow tilling ruffled coulters 17c extends behind the shallow tilling toothed coulters 17b. The element 116c controls the depth of penetration of the plurality of shallow tilling toothed coulters 17c of the fourth tool frame F4 to raise or lower the shallow tilling ruffled coulters as a group to penetrate the ground from 1 to 4 inches. The shallow tilling ruffled coulters mix and incorporate plant debris within the tilled soil, reducing soil erosion by rain water or irrigation water. This set of ruffled shallow tilling coulters is always provided to mix the plant debris intimately within the tilled soil. The operator selects the rotational speed of these shallow tilling toothed coulters by the translational speed of the tilling system. The shallow tilling curved coulters, inclined toothed coulters as well as the ruffled coulters displace and smoothen mounds formed around deep tilled grooves, leaving behind a smooth tilled field. The tilling load for the deep tilling tines and the shallow tilling coulters is applied by conventional means, such as spring force, compressed air pistons or hydraulically actuated rams. The elements 13, 116a, 116b arid 116c contain a spring loading device, compressed air pistons and hydraulic cylinders providing height adjustment of deep tilling tines and coulters. The tillage system tool bar A may carry an optional segment 15d that carries tool frame F5 that carries tillage tools such as harrow tools, cage rollers or packer wheels. FIG. 10 shows a cage roller 18 attached at the very end of the tillage system smoothening the tilled field.

Figure 11:
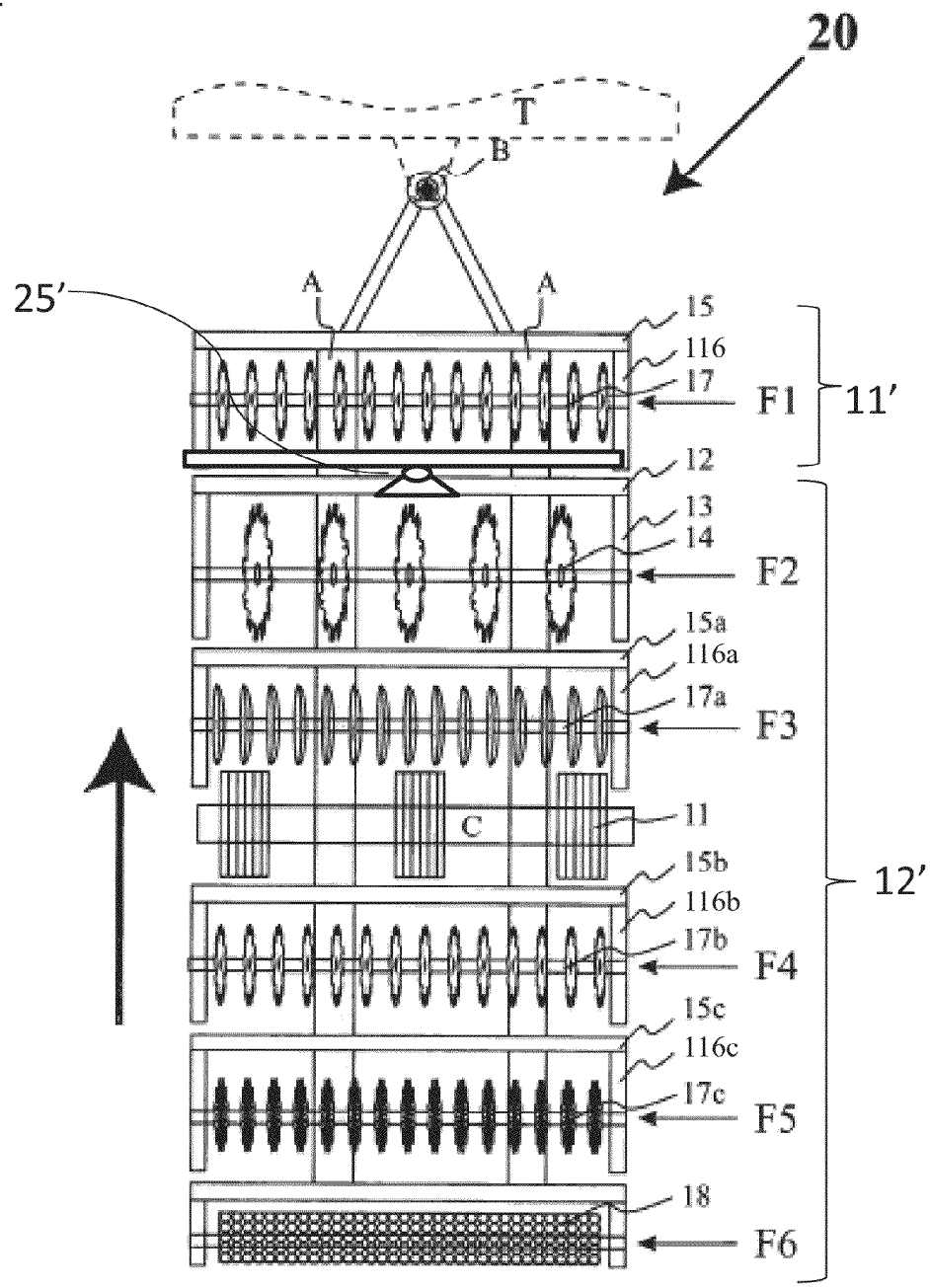
FIG. 11 is a plan view of another embodiment of a tillage system schematically illustrating a plurality of sets of shallow tilling coulters with one set placed in front and several sets placed behind a set of deep tilling tines.

FIG. 11 is similar to FIG. 10 in every aspect except a row of shallow tilling toothed coulters of frame F1 is provided before the deep tilling tines of frame F2. The common tool bar A connects to the first tool bar segment 15 that carries the first frame F1 that has shallow tilling toothed coulters or ruffled coulters 17 to cut and size large length plant stock such as corn or other tall plants enabling easy tilling with deep tilling tines 14 in frame F2. A depth of penetration adjustment means, element 116, is connected to first tool bar segment 15 and this adjustment means is selected from the group consisting of a spring force, compressed air pistons or hydraulically actuated rams. The element 116 controls the depth of penetration of the plurality of shallow tilling toothed coulters 17 of the first tool frame F1 to raise or lower the shallow tilling toothed coulters as a group. The frame F1 may be raised or lowered by the operator of the tillage system using penetration adjustment means, element 116. Clearly more than one shallow tilling toothed coulter may be inserted in any location within the rows of shallow tillers. The last row F7 of shallow tilling coulter is always a ruffled shallow coulter to enable mixing and incorporation of plant debris into the tilled soil. FIG. 11 shows a cage roller 18 attached at the very end of the tillage system smoothening the tilled field.

Figure 12:
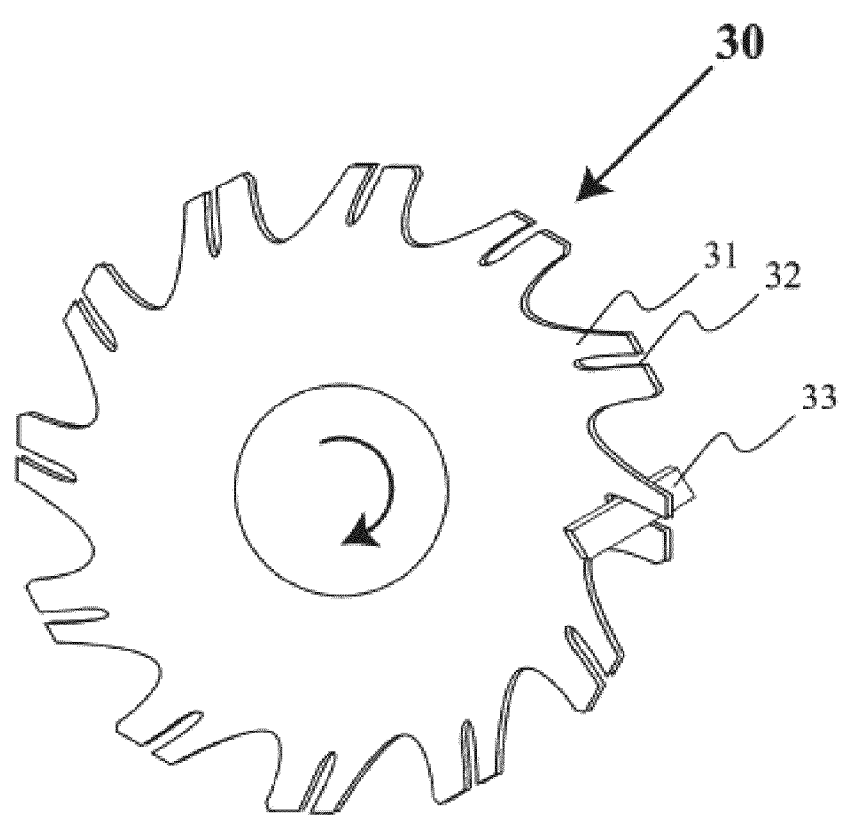
FIG. 12 illustrates the constructional details of the deep tilling tines.

FIG. 12 illustrates at 30 the details of the first set of deep tilling tines. The deep tilling tines have a plurality of teeth with channels 31 that dig deep into the soil. The channels carry an inserted hard steel bit 32 that is positioned and anchored within the channel 31. Only one of the inserted hard steel bits 32 is shown for clarity. The inserted bits 32 protrude from the surface of the deep tilling tines, widening the groove formed within the soil and displacing the soil to the surface of the field being tilled. The inserted bits may be replaceable and held in place by a number of means, including bolting, tapered fit and other suitable means. The inserts may be also permanently attached. While this form of deep tilling tine is a preferred embodiment other commercial coulters with a diameter capable of deep tilling to a depth of 5 to 12 inches may be also used.

Figure 13:
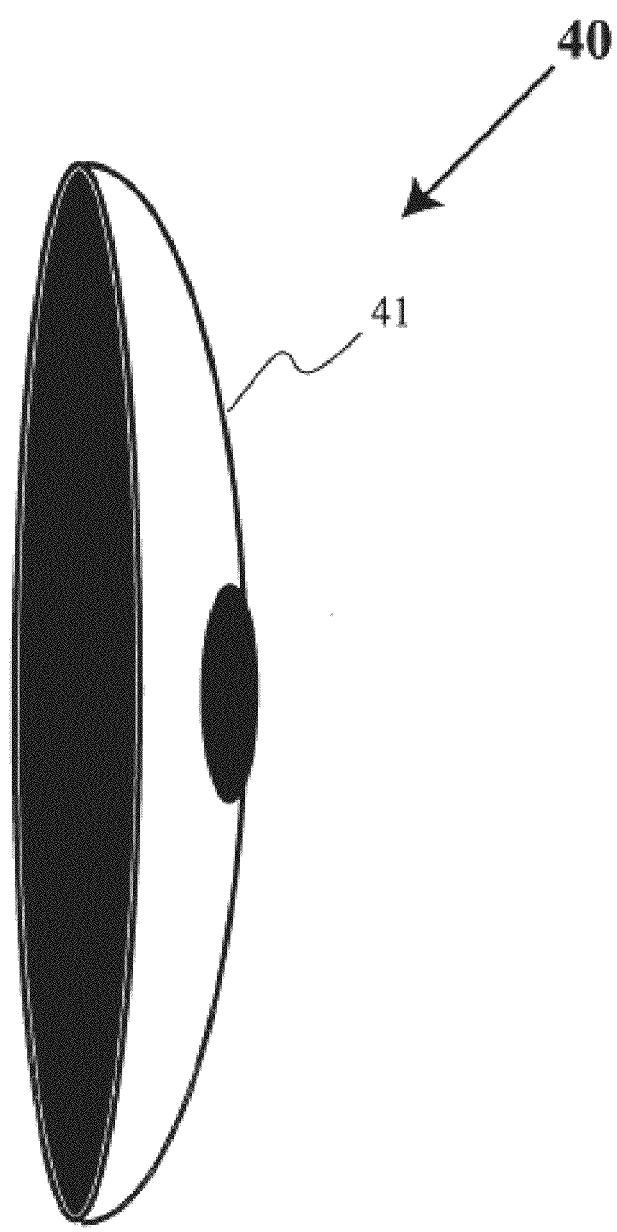
FIG. 13 illustrates the constructional details of a curved shallow tilling coulter that forms a second row in FIGS. 1 and 2.

FIG. 13 illustrates at 40 the details of the curved coulter which displaces soil laterally as the coulters till the ground. The curved coulter is shown at 41 with a convex curvature. The central aperture is used to attach a plurality of curved coulters on a shaft or separately mounted at selected distances.

Figure 14:
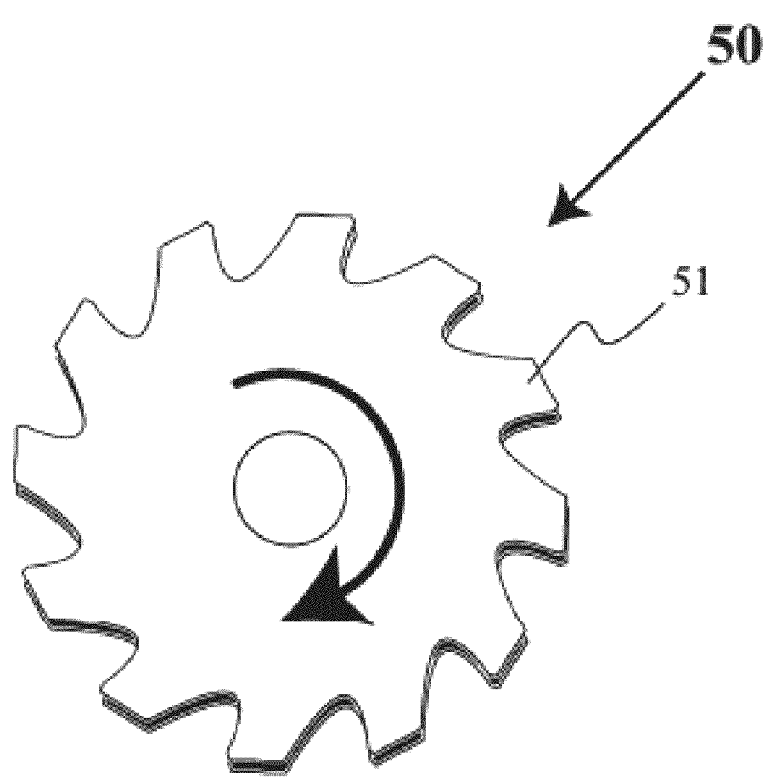
FIG. 14 illustrates the constructional details of a toothed shallow tilling coulter.

FIG. 14 illustrates the details of a shallow tilling toothed coulter or ruffled coulter. The toothed coulter or ruffled coulter is typically smaller in diameter than the deep tilling tines and have sharp teeth 51. The shallow tilling coulters may be mounted at an angle typically in the range of 0 to 10 degrees with respect to the direction of movement of the tillage system, and thus move the soil laterally. A mound created by the first set of deep tilling tines will be smoothened by the second set of shallow tilling coulters as they pass through the field being tilled. While this shallow tilling toothed coulter is a preferred embodiment, alternate coulters that shallow till in the range of 1 to 4 inch may be also used.

Figure 15:
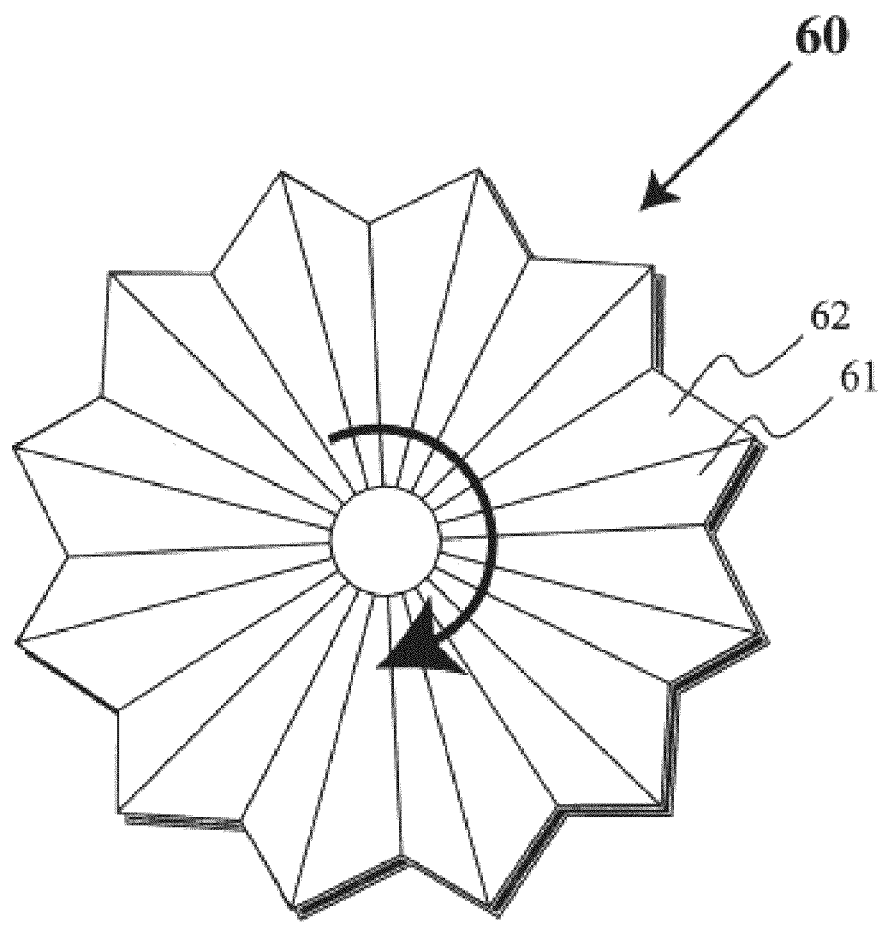
FIG. 15 illustrates the constructional details last row of shallow tilling coulter having a ruffled disk configuration

FIG. 15 illustrates at 60 the details of the shallow tilling ruffled coulter. The ruffled coulters are typically smaller in diameter than the deep tilling tines and have sharp teeth. The body of the shallow tilling coulter tines is not flat, but is a series of ruffled folds (as shown) and tends to move the soil backwards and forwards, propelling the soil sideways. The adjacent ruffles are shown at 61 and 62. A mound created by the first set of deep tilling tines will be smoothened by the shallow tilling ruffled coulters as they pass through the field being tilled. The shallow tilling ruffled coulters mix and incorporate plant debris into the tilled soil promoting water and soil conservation. A wave coulter functions similar to the ruffled coulter and may also be used.

Figure 16:
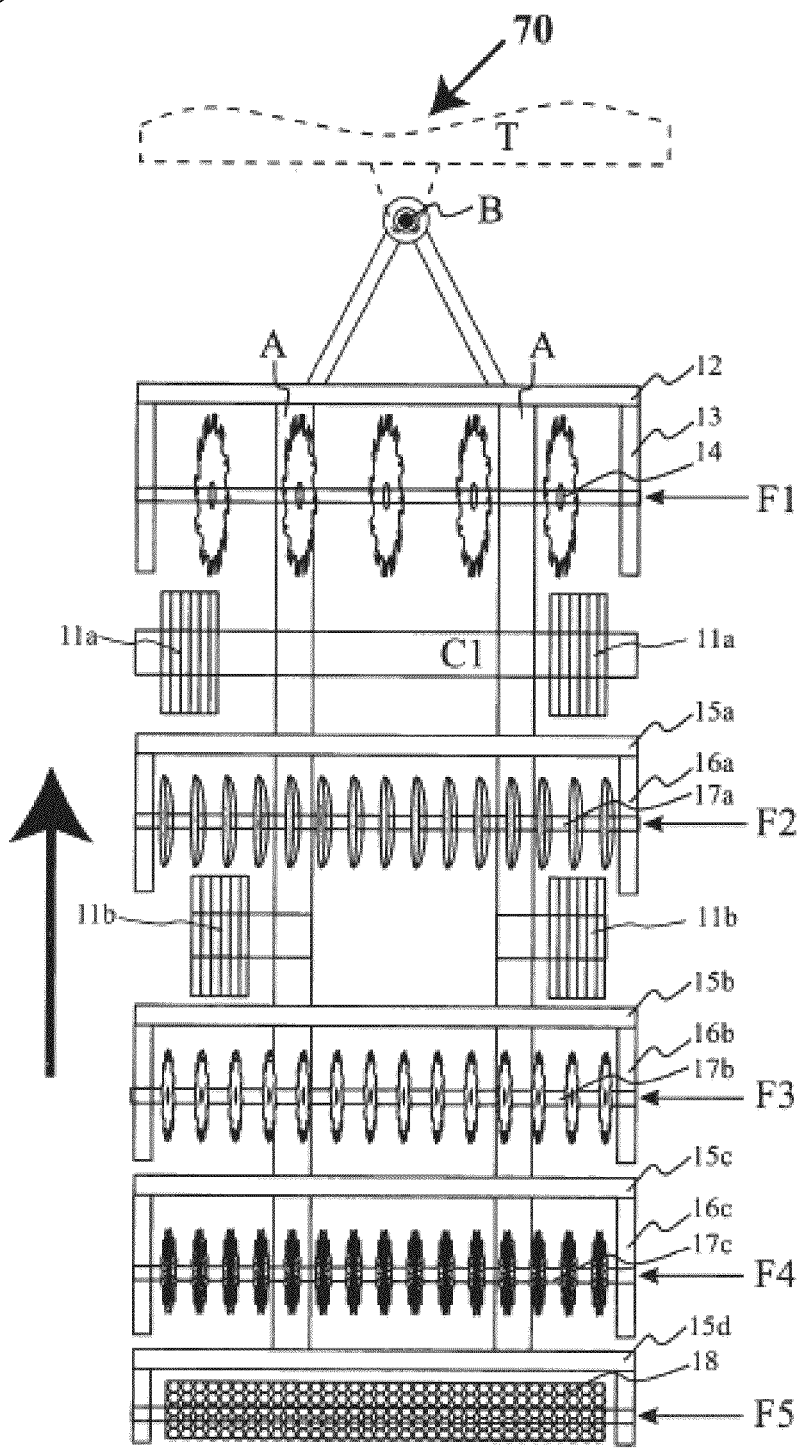
FIG. 16 is a plan view schematically illustrating a tilling unit having a front set of support wheels and a back set of support wheels with a plurality of sets of shallow tilling coulters placed behind a first set of deep tilling tines.

FIG. 16 illustrates generally at 70 a plan view of a typical tillage system according to the present invention. The tillage system comprises a tillage unit and a tractor hitched to it. The tractor truck moves in the direction of the arrow. The tillage unit has common tool bar A carried by two pairs of wheels 11*a* and 11*b* that carry a plurality of tool frames F1, F2, F3, F4 and F5. The front wheel pair 11*a* is shown to have a common shaft C1 while the back wheel pair 11*b* does not have a common shaft. The tillage unit is attached to a tractor T using the hitch B. The tool bar A connects to a first tool bar segment 12. A depth of penetration adjustment means, element 13, is connected to first segment bar 12 and this adjustment means is selected from the group consisting of a spring force, compressed air pistons or hydraulically actuated rams. The element 13 controls the depth of penetration of the plurality of deep tilling tines 14 of the first tool frame F1 to raise or lower the deep tilling tines as a group. The penetration depth of the deep tilling tines typically ranges from about 5 to 12 inches for fall or primary tilling and 5 to 8 inches for spring or finish tiling. The operator of the tillage system also controls the rotational speed of these deep tilling wheels by the speed of movement of the tillage system. The common tool bar A connects to a second tool bar segment 15*a* at one end and the other end connects to a depth of penetration controlling element 16*a* which is selected from group consisting of a spring force, compressed air pistons or hydraulically actuated rams. The tool frame F2 connected to depth penetration control element 16*a* extends behind the deep tilling tines 14. The element 16*a* controls the depth of penetration of the plurality of shallow tilling curved coulters 17*a* of the second tool frame F2 to raise or lower the shallow tilling curved coulters as a group to penetrate the ground from 1 to 4 inches and push the tilled soil laterally. In fields that do not require this function, the curved coulters may be raised above the ground. The operator selects the rotational speed of these shallow tilling curved coulters by the translational speed of the tilling system. The common tool bar A connects to a third tool bar segment ISb at one end and the other end connects to a depth of penetration controlling element 16*b* which is selected from group consisting of a spring force, compressed air pistons or hydraulically actuated rams. The tool frame F3 of shallow tilling toothed coulters or waffle coulters 17*b* extends behind the shallow tilling curved coulters 17*a* and is connected to depth of penetration controlling element 16*b*. The element 16*b* controls the depth of penetration of the plurality of shallow tilling toothed coulters 17*b* of the third tool frame F3 to raise or lower the shallow tilling toothed coulters as a group to penetrate the ground from 1 to 4 inches. The orientation of the shallow tilling toothed coulters may be selected from 0 degrees (along the translation direction of the tillage system) or 10 degrees with respect to this translation direction. When the shallow tilling toothed coulter is inclined, it pushes the tilled soil laterally in a direction perpendicular to the tilling system translation direction in a manner similar to the shallow tilling curved coulters. The operator selects the rotational speed of these shallow tilling toothed coulters by the translational speed of the tilling system. The common tool bar A connects to a fourth tool bar segment 15*c* at one end and the other end connects to a depth of penetration controlling element 16*c* which is selected from group consisting of a spring, compressed air piston or hydraulic cylinder. The tool frame F4 of shallow tilling ruffled coulters 17*c* extends behind the shallow tilling toothed coulters 17*b* and is connected to depth of penetration controlling element 16*c*. The element 16*c* controls the depth of penetration of the plurality of shallow tilling toothed coulters 17*c* of the fourth tool frame F4 to raise or lower the shallow tilling ruffled coulters as a group to penetrate the ground from 1 to 4 inches. The shallow tilling ruffled coulters mix and incorporate plant debris within the tilled soil, reducing soil erosion by rainwater or irrigation water. This set of ruffled shallow tilling coulters is always provided to mix the plant debris intimately within the tilled soil. The operator selects the rotational speed of these shallow tilling toothed coulters by the translational speed of the tilling system. The shallow tilling curved coulters, inclined toothed coulters as well as the ruffled coulters displace and smoothen mounds formed around deep tilled grooves, leaving behind a smooth tilled field. The tilling load for the deep tilling tines and the shallow tilling coulters is applied by conventional means, such as spring force, compressed air pistons or hydraulically actuated rams. The elements 13, 16*a*, 16*b* and 16*c* contain a spring loading device, compressed air pistons and hydraulic cylinders providing height adjustment of deep tilling tines and coulters. The tillage system common tool bar A may carry an optional segment 15*d* that carries tool frame F5 that carries tillage tools such as harrow tools, cage rollers or packer wheels. FIG. 16 shows a cage roller 18 attached at the very end of the tillage system smoothening the tilled field.

Figure 17:
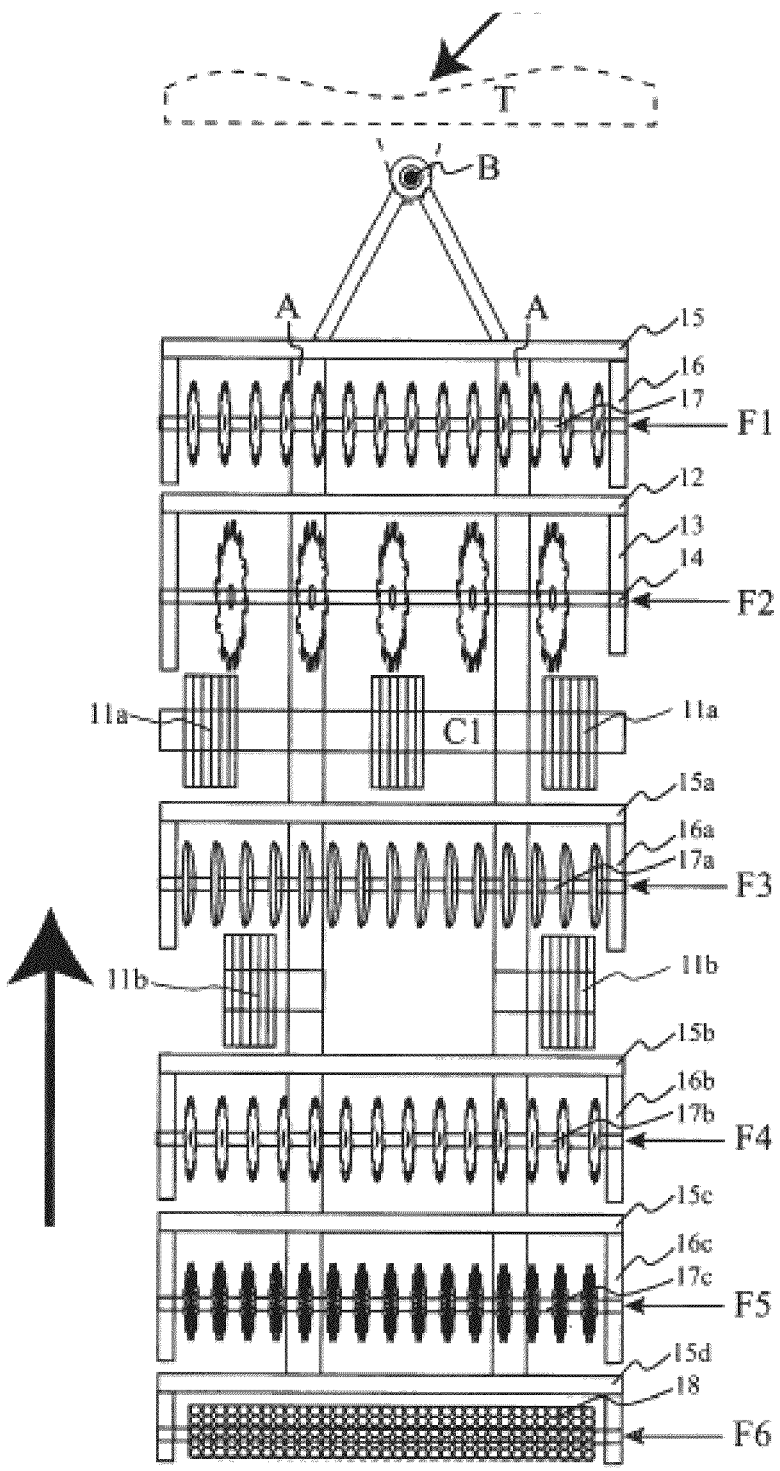
FIG. 17 is a plan view schematically illustrating a tilling unit having a front set of support wheels and a back set of support wheels with a plurality of sets of shallow tilling coulters with one set placed in front and several sets placed behind a set of deep tilling tines.

FIG. 17 is similar to FIG. 16 in every aspect except a row of shallow tilling toothed coulters 17 of frame F1 is provided before the deep tilling tines of frame F2. The tillage unit includes a common tool bar A carried by two pairs of wheels 11*a* and 11*b* that carry a plurality of tool frames F1, F2, F3, F4, F5 and F6. The front wheel pair 11*a* is shown to have a common shaft C1 while the back wheel pair 11*b* does not have a common shaft. The tool bar A connects to the first tool bar segment 15 that carries the first frame F1 that has shallow tilling toothed coulters or ruffled coulters 17 to cut and size large length plant stock such as corn or other tall plants enabling easy tilling with deep tilling tines 14 in frame F2. The frame F1 may be raised or lowered by the operator of the tillage system using penetration adjustment means, element 16. Clearly more than one shallow tilling toothed coulter may be inserted in any location within the rows of shallow tillers. The last row F7 of shallow tilling coulter is typically a ruffled shallow coulter to enable mixing and incorporation of plant debris into the tilled soil. FIG. 17 shows a cage roller 18 attached at the very end of the tillage system smoothening the tilled field.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An add-on tillage system comprising:
   a) a tilling unit having a common tool bar having attached thereto a first set of a plurality of tilling tines or coulters adapted to produce deep grooves in a tilled field;
   b) means for adjusting spacing between the tines or coulters;
   c) means for adjusting the tilling tines or coulters up and down as a group being loaded by spring force, compressed air pistons or hydraulically actuated rams;
   d) said common tool bar having a first mount adapted to receive a tongue with hydraulic mount for mounting to a tractor or power generating agricultural device;
   e) said common tool bar having a second mount adapted for mounting to an agricultural device adapted to be pulled by said tractor or power generating agricultural device;
   f) said first set of tilling tines being deep tilling tines and said common tool bar comprising a second tool bar segment carrying a second tool frame attached to a plurality of rows carrying sets of shallow tilling curved coulters, the total number of coulters carried by the sets being more than twice the number of deep tilling tines and being provided with additional means for adjusting said coulters up and down as a group loaded by spring force, compressed air pistons or hydraulically actuated rams, and shallow tilling coulters rotating at a rotational speed matching the ground speed of said tillage system, and said shallow tilling curved coulters on the second tool bar segment being adapted to displace soil laterally during tilling;
   whereby the add-on tillage system provides tilling ability to said agricultural device so that said add-on tillage system tills surface soil for a clean tilled field appearance, providing sufficient water absorption for rain or irrigation water, substantially eliminating water run-off, as well as soil erosion.

2. The add-on tillage system as recited by claim 1, wherein said first set of tillage tines comprises inserted hardened steel elements that extend from the surface.

3. The add-on tillage system as recited by claim 1, wherein said first set of tillage tines rotate at a rotational speed adapted to match the ground speed of said tillage system.

4. The add-on tillage system as recited by claim 1, wherein said first set of tillage tines are deep till tines tilling to a depth of about 5 to 12 inches creating deep tilled grooves in the field according to the spacing of the deep till tines.

5. The add-on tillage system as recited by claim 1, wherein said common tool bar comprises at least two sets of plurality of tilling tines and/or coulters.

6. The add-on tillage system as recited by claim 1, wherein said second set of shallow tilling coulters are adjustable in orientation with respect to the direction of movement of said tiller.

7. The add-on tillage system as recited by claim 1, wherein said common tool bar has a third tool bar segment directly behind the second tool bar segment that carries a row of shallow tilling toothed coulters.

8. The add-on tillage system as recited by claim 1 comprising a shallow tilling toothed coulter or waffle coulter being provided in front of said tilling tines in order to size large length tall plant debris prior to deep tilling.

9. The add-on tillage system as recited by claim 8, wherein said shallow tilling coulters number in comparison to the number of the deep tilling tines is within a range of 2.1 to 4.

10. The add-on tillage system as recited by claim 1, wherein said first set of a plurality of tilling tines or coulters are commercial coulters with a diameter to till 5 to 12 inches and shatter soil.

11. The add-on tillage system as recited by claim 1 comprising a fertilizer delivery means.

12. The add-on tillage system as recited by claim 11, wherein said fertilizer delivery means is located directly behind said first set of a plurality of tilling tines or coulters.

13. The add-on tillage system as recited by claim 1, wherein said first set of a plurality of tilling tines or coulters are foldable.

14. The add-on tillage system as recited by claim 1, wherein said agricultural device is selected from the group consisting of conventional disk harrows, vertical till devices, short disk harrow device, and disk rippers.

15. The add-on tillage system as recited by claim 1, wherein said agricultural device is a disk and vertical till combo.

16. The add-on tillage system as recited by claim 1, wherein said first set of a plurality of tilling tines or coulters are shallow curved coulters with or without waffle edges.

17. The add-on tillage system as recited by claim 1, wherein said first set of a plurality of tilling tines or coulters are straight waffle coulters.

18. The add-on tillage system as recited by claim 1, wherein said first set of a plurality of tilling tines or coulters are replaceable with different tillage wheels.

* * * * *